US008989494B2

(12) United States Patent
Itoko et al.

(10) Patent No.: US 8,989,494 B2
(45) Date of Patent: *Mar. 24, 2015

(54) READING ORDER DETERMINATION APPARATUS, METHOD, AND PROGRAM FOR DETERMINING READING ORDER OF CHARACTERS

(75) Inventors: Toshinari Itoko, Kanagawa-ken (JP); Daisuke Sato, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 373 days.

This patent is subject to a terminal disclaimer.

(21) Appl. No.: 13/488,645

(22) Filed: Jun. 5, 2012

(65) Prior Publication Data

US 2012/0316864 A1    Dec. 13, 2012

(30) Foreign Application Priority Data

Jun. 8, 2011    (JP) .................. 2011-128213

(51) Int. Cl.
*G06K 9/32*   (2006.01)
*G06K 9/18*   (2006.01)
*G06K 9/03*   (2006.01)
*G06K 9/72*   (2006.01)

(52) U.S. Cl.
CPC ...................... *G06K 9/72* (2013.01)
USPC ........................ 382/185; 382/177; 382/309

(58) Field of Classification Search
CPC ................................. G06K 9/00463
USPC ........................ 382/185, 177, 309
See application file for complete search history.

(56) References Cited

U.S. PATENT DOCUMENTS

| 5,553,217 | A  | * | 9/1996  | Hart et al. ............... 715/210 |
| 2006/0274938 | A1 | * | 12/2006 | Ortega et al. ............... 382/173 |
| 2006/0288279 | A1 | * | 12/2006 | Yacoub et al. ............... 715/530 |
| 2007/0081179 | A1 | * | 4/2007  | Nishida ............... 358/1.11 |
| 2010/0198827 | A1 | * | 8/2010  | Yacoub et al. ............... 707/739 |
| 2010/0211871 | A1 | * | 8/2010  | Kubota et al. ............... 715/247 |
| 2011/0026827 | A1 | * | 2/2011  | Sato ............... 382/176 |
| 2011/0222771 | A1 | * | 9/2011  | Cimpoi et al. ............... 382/176 |
| 2011/0289395 | A1 | * | 11/2011 | Breuel et al. ............... 715/205 |
| 2012/0321191 | A1 | * | 12/2012 | Itoko et al. ............... 382/182 |

FOREIGN PATENT DOCUMENTS

| JP | 2008-225964 A | 9/2008 |
| JP | 2012256160 A  | 12/2012 |

* cited by examiner

*Primary Examiner* — Kathleen Y Dulaney
(74) *Attorney, Agent, or Firm* — Patricia B. Feighan; Jennifer R. Davis

(57) ABSTRACT

A method and apparatus for determining a reading order of characters The method includes preparing a list of character information, which is character information extracted from image data by character recognition processing and preparing a list of line information, which is made up of a line box surrounding a set of characters which are continuously aligned in the same direction in image data and an alignment direction of characters in the line box. In response to a request for adding character information to the list of character information, extracting a line box containing a character region of the character to be added, obtaining all character information having the character region contained in the concerned line box from the list of character information and rearranging according to the position with respect to the alignment direction of characters corresponding to the line box to determine a new reading order of characters.

6 Claims, 19 Drawing Sheets

FIG. 2
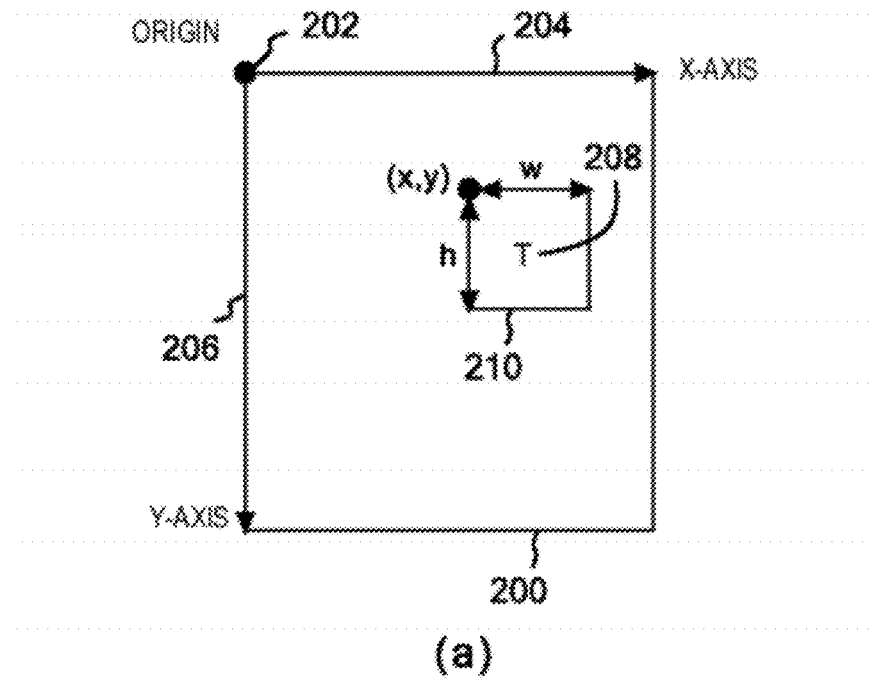
(a)
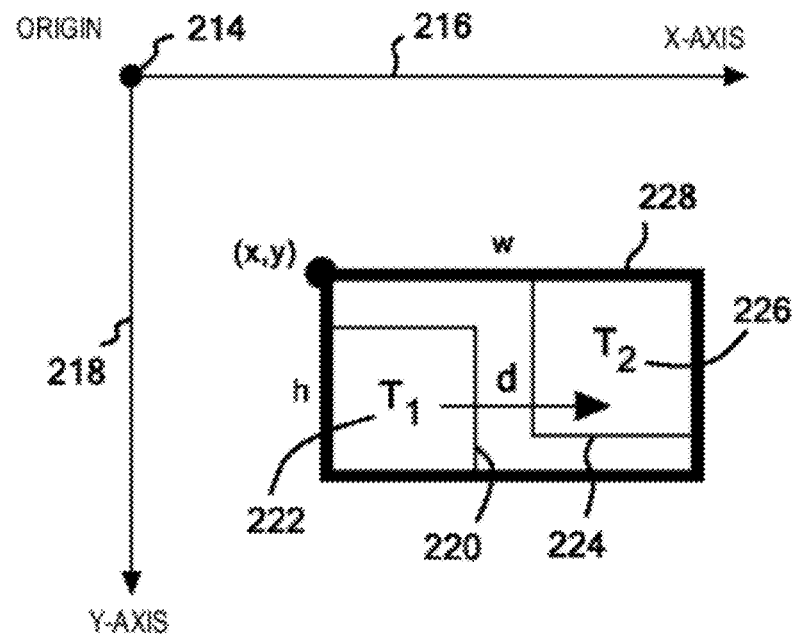
(b)

READING ORDER DETERMINATION APPARATUS, METHOD, AND PROGRAM FOR DETERMINING READING ORDER OF CHARACTERS

CROSS-REFERENCE TO RELATED APPLICATION

This application claims priority under 35 U.S.C. §119 from Japanese Patent Application No. 2011-128213 filed Jun. 8, 2011, the entire contents of which are incorporated herein by reference.

BACKGROUND OF THE INVENTION

1. Field of the Invention

The present invention relates to a technique for determining a reading order of characters for a set of characters extracted from image data by character recognition processing by computer operations. In particular, the present invention relates to a technique for properly determining a reading order of characters even after a modification for correcting a character recognition error is performed.

2. Description of Related Art

When there is a character recognition error in text data acquired by an optical character reader (OCR), it is necessary to edit the reading order of characters in accordance with the modification of character region. When the error of character recognition is a recognition error in the unit of character and is modified by the integration or division of character regions, a new reading order of characters can be determined. This is done by computer operations utilizing the orders assigned to character regions before modification.

Japanese Patent Publication 2008-225964A discloses a technique as preprocessing of OCR, in which a region to be processed is divided according to a predetermined identification condition so that image regions are set and a reading order is set for each region, and when a user instructs a modification to integrate regions, a plurality of regions before modification which overlap with a newly created region are searched to succeed the reading order which has been assigned to a region having the largest overlap area among a plurality of detected regions, as a reading order of newly integrated region.

The technique for automatically correcting reading order disclosed by Japanese Patent Publication 2008-225964A, however, is based on a premise that a newly created area overlaps with a region before correction. For that reason, even if the above described automatic correction technique is applied to the correction of the reading order of characters at the time of correction of an error of character recognition by OCR, it is necessary to manually edit a text sequence when a correction such as newly adding a region which has not been recognized at all, like an omission of character.

The present invention solves the above described problems and aims to provide a technique for determining a reading order of characters by computer operations. The technique is applicable to the modification of character region due to addition of a character region which has not been recognized. Further, it is another object of the present invention to provide a technique for determining the reading order of characters by means of computer operations, which can be applied to all types of modification including: integration, division, new insertion of a character region.

The present invention determines the reading order of a character of a character region contained in a line box according to the alignment direction of characters in the line box, by preparing in advance a list of line information, in which line information made up of a line box surrounding a set of characters which are continuously aligned in the same direction in image data, and an alignment direction of characters in the line box, is listed in the alignment order of lines. Therefore, according to the present invention, it is possible to determine the reading order of characters after modification based on the alignment direction of characters of a line box containing a modification region even if any of modifications of integration, division, or new insertion of character region. Other advantageous effects of the present invention will be understood from the description of each embodiment.

SUMMARY OF THE INVENTION

According to a first aspect of the invention, a reading order determination apparatus for determining a reading order of characters is provided. The apparatus includes a character information storage unit for storing a list of character information, where the list containing character information made up of text data and character region data of each character extracted from image data by character recognition processing aligned in a reading order of characters, a line information storage unit for storing a list of line information, where the list listing line information made up of a line box that surrounds a set of characters continuously aligned in the same direction and an alignment direction of characters in the line box in the alignment order of lines, a detection unit for, in response to a request for addition of character information to the list of character information, detecting line information having a line box containing a region indicated by character region data of added character information from the list of line information, a subset determination unit for obtaining a subset of character region data from the list of character information, each character region data indicating a region contained in the line box of the line information detected by the detection unit, a rearrangement unit for rearranging each character region data in the subset according to a position with respect to the alignment direction of characters of the line information that has been detected, and a order determination unit for determining a reading order of characters in the list of character information by updating the list of character information based on an alignment order of character region data in the subset.

According to a second aspect of the invention, a reading order determination apparatus for determining a reading order of characters is provided. The apparatus includes a character information storage unit for storing a list of character information which is a list of character information made up of text data and character region data of each character extracted from image data by character recognition processing, a line information storage unit for storing a list of line information, where the list listing line information made up of a line box that surrounds a set of characters continuously aligned in the same direction and an alignment direction of characters in the line box in the alignment order of lines, a subset determination unit for reading out line information from the list of line information and obtains a subset of character region data that indicates a region contained in a line box of the line information which has been read out, a rearrangement unit for rearranging each character region data in the subset according to a position with respect to the alignment direction of characters of the corresponding line information, and a order determination unit for determining a reading order of characters in the list of the character information by successively joining the subset of character region data which has been rearranged for each piece of line information in the alignment order of lines.

According to a third aspect of the invention, a reading order determination method for determining a reading order of characters by a computer is provided, wherein the computer is accessible to a character information storage unit for storing a list of character information, the list containing character information made up of text data and character region data of each character extracted from image data by character recognition processing aligned and listed in a reading order of characters, and a line information storage unit for storing a list of line information, the list listing line information made up of a line box that surrounds a set of characters continuously aligned in the same direction and an alignment direction of characters in the line box in the alignment order of lines. The method includes detecting line information having a line box containing a region indicated by character region data of added character information from the list of line information in response to a request for addition of character information to the list of character information, obtaining a subset of character region data from the list of character information, where the character region data indicating a region contained in the line box of the line information detected by the detection means, rearranging each character region data in the subset according to a position with respect to the alignment direction of characters of the line information that has been detected, and determining a reading order of characters in the list of character information by updating the list of character information based on an alignment order of character region data in the subset.

BRIEF DESCRIPTION OF THE DRAWINGS

FIG. 2(a) is an explanation diagram to illustrate the format of a character region, and 2(b) is an explanatory diagram to illustrate the format of line information;

DETAILED DESCRIPTION OF THE PREFERRED EMBODIMENTS

Figure 1:
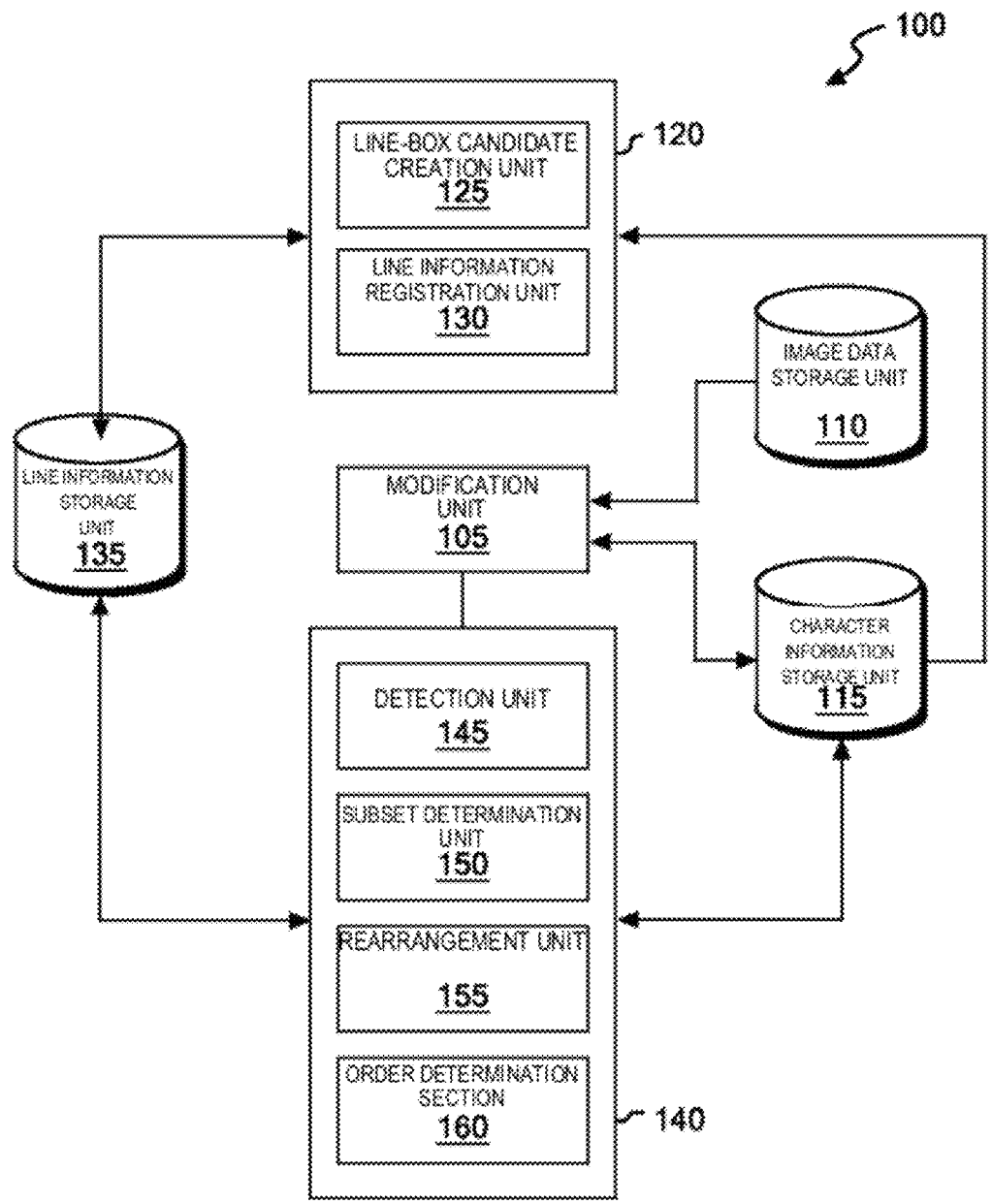
FIG. 1 shows an example of the functional configuration of a reading order determination apparatus relating to an embodiment of the present invention.

While, hereafter, the best mode for carrying out the present invention will be described in detail based on the drawings, embodiments described below will not limit the invention relating to the claims of patent, and all of the combinations of features described in the embodiments are not necessarily essential to the solutions of the invention. It is noted that the like components are given the same reference numerals throughout the description of the embodiments.

Example 1

FIG. 1 shows an example of the functional configuration of a reading order determination apparatus 100 relating to Example 1 of the present invention. The reading order determination apparatus 100 includes an image data storage unit 110 for storing image data which is converted into electronic data by a scanner, a character information storage unit 115 for storing a list of character information extracted from the image data by OCR, a compression processing unit 120 for creating line information from the list of character information, a line information storage unit 135 for storing the created line information, a modification unit 105 for enabling the comparison between the image data and the character information to allow a user to modify the result of character recognition processing by OCR, and a decompression processing unit 140 for determining a reading order of characters of a set of character information to be stored in the character information storage unit 115 by using line information.

It is noted that the image data storage unit 110 and the modification unit 105 can be provided outside the reading order determination apparatus 100 so that the reading order determination apparatus 100 receives a modification result from the modification unit 105. It can be further configured such that the reading order determination apparatus 100 updates the list of character information to be stored in the character information storage unit 115 based on the received modification result.

The image data stored in the image data storage unit 110 is image data that includes characters. The unit for storage thereof can be image data for every one page of any document, or image data for a unified region in one page of any document. A description will be made assuming that image data is image data for every page of any document.

Each piece of character information stored in the character information storage unit 115 includes text data and character region data of each character included in the image data. The data format of character region data will be described with reference to FIG. 2(a). First, letting the left upper corner of a page 200 including character T 208 be an origin 202, it is defined that the upper end of the page 200 be an X-axis 204 (horizontal axis), and the left end be a Y-axis 206 (vertical axis). Since it can be considered that almost all the characters are aligned along X-axis 204 or Y-axis 206, a rectangular character region 210 surrounding character T 208 can be represented by coordinates (x, y) at the left upper corner, the width w of the character region 210, and the height h of the character region 210, in the coordinates defined as described above.

As a matter of course, the data format of character region data will not be limited to this one, and another format which includes equivalent information such as all the apexes of the rectangular can be utilized. It is noted that all character Ts shown in the drawings of the present specification indicate a character of any language. Moreover, it is supposed that all the coordinates represented in the drawings of the present invention are defined as with the coordinates described above.

The character information storage unit 115 stores a list of character information in which character information represented as described above is listed in the reading order of characters. As described above, such a list of character information can be acquired as a result of character recognition processing by OCR. A data structure 'Symbol' of character information and a data structure 'Page' of the list of character information will be shown below as an example.

```
class Symbol {
  char character;
  int x, y, width, height;
}
class Page{
  Symbol[ ] symbols;
}
```

The compression processing unit 120 reads out a list of character information from the character information storage unit 115 to create a list of line information and store it in the line information storage unit 135. The line information refers to information consisting of a line box that surrounds a set of characters continuously aligned in the same direction in image data, and an alignment direction of characters in the line box. The present invention enables the determination of correct reading order of characters even when the list of character information is modified later, by introducing such line information and preparing in advance a list of line information which is listed in the alignment order of lines.

The format of line information will be described with reference to FIG. 2(b). In FIG. 2(b), for the sake of simplicity, it is assumed that there are two characters T1 222 and T2 226 which are continuously aligned in the same direction. A line box 228 surrounding these two characters is defined as a minimum rectangle that surrounds the character region 220 of character T1 222 and the character region 224 of character T2 226. The line box 228 can be represented by the coordinates (x, y) of the left upper corner of the line box, the width w of the line box, and the height h of the line box. The alignment direction d of characters in the line box shows either one of an X-axis 216 or a Y-axis 218.

It is noted that when two or more characters are not continuously aligned in the same direction, the character region of one character is assumed to the line box as it is, and line information without information relating to the alignment direction of characters is created. Such a line box as is made up of one character region is referred to as a single character line box. The format of the line box will not be limited to this one, another format which includes equivalent information such as coordinates of all the apexes of the rectangle can be utilized. It is assumed in the present invention that a certain character region is not fully included in another character region.

The line information storage unit 135 stores a list of line information in which line information represented as described above is listed in the alignment order of lines. A data structure 'Line' of line information and a data structure 'Order' of the list of line information will be shown below as an example.

```
class Line {
  int x, y, width, height;
  int dx, dy
}
class Order{
  Line[ ] lines;
}
```

The compression processing unit 120 includes a line-box candidate creation unit 125 and a line information registration unit 130. The line-box candidate creation unit 125 reads out character region data in order from the head of a list of character information stored in the character information storage unit 115 assuming it to be a current character region, and initializes the line box candidate with the first character region data. The line-box candidate creation unit 125 also determines the alignment direction of characters in the line box candidate by first two character region data.

The line-box candidate creation unit 125 then expands the line box candidate to a minimum line box that further contains the current character region until the current character region becomes absent in the determined alignment direction of characters. When the current character region becomes absent in the alignment direction of characters, the line-box candidate creation unit 125 repeats the above described series of processing with the current character region being as the character region data at the head of the list of character information.

The line information registration unit 130 prepares a list of line information at the start of compression processing and initializes that will null. The line information registration unit 130 also registers a current line box candidate as line information along with the corresponding alignment direction of characters, at the tail end of the list of line information, and stores it in the line information storage 135 every time when it is detected that a current character region is absent in the alignment direction of characters in the above described processing by the line-box candidate creation unit 125.

Figure 3:
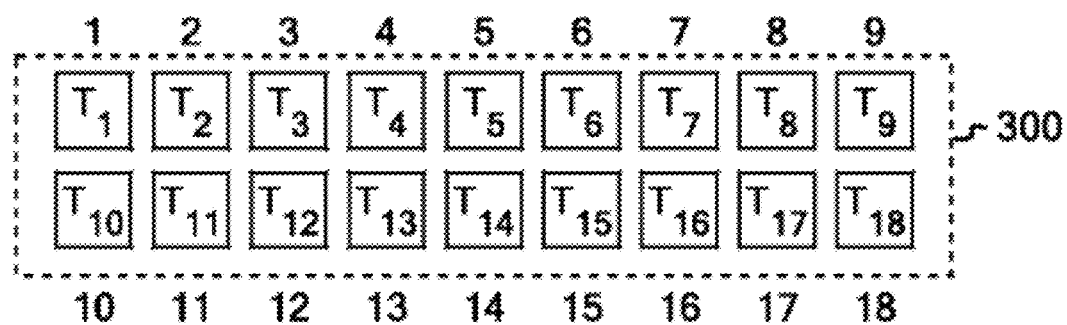
FIG. 3 shows an example of character image data.
Figure 4:
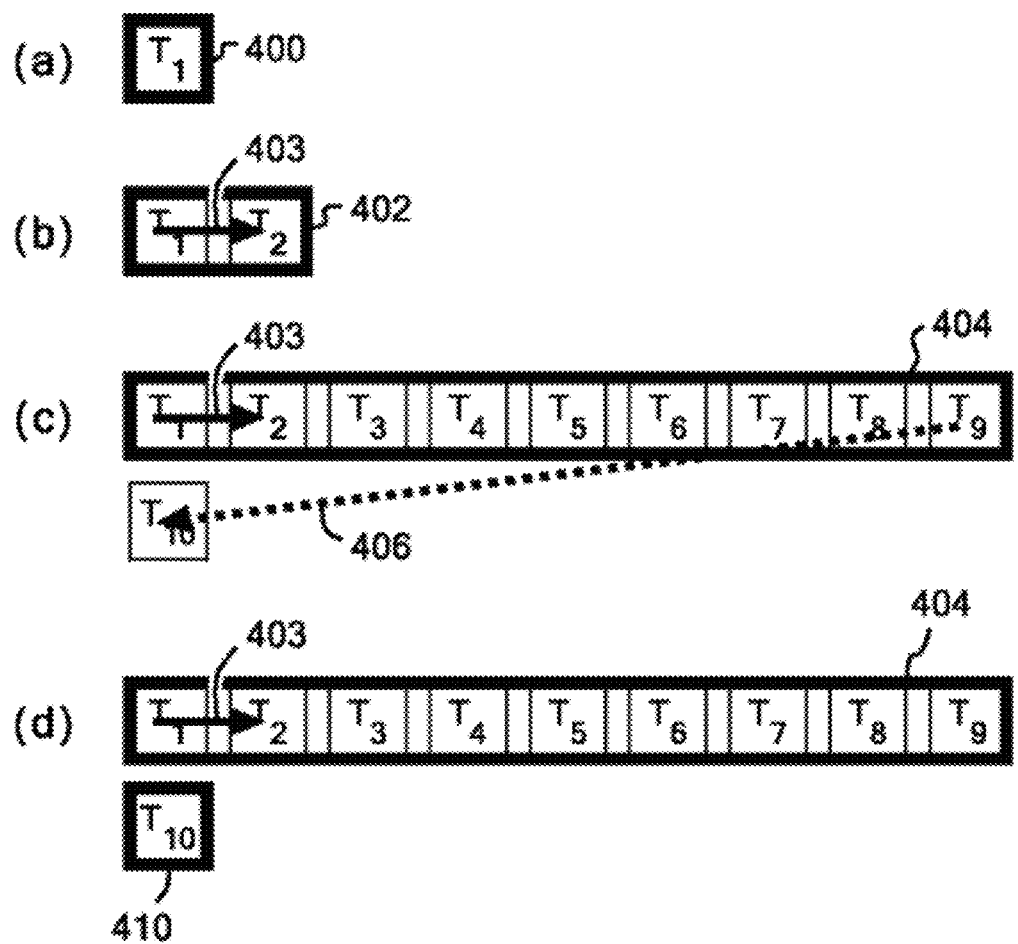
FIGS. 4(a) to 4(d) respectively are explanatory diagrams of each step of a compression process.

An outline of the compression processing by the line-box candidate creation unit 125 and the line information registration unit 130 will be described with reference to FIGS. 3 and 4. FIG. 3 shows image data 300 of a character set consisting of two lines. FIG. 4 shows each step of compression process. It is assumed that at the start of processing, a list of character information extracted from the image data 300 is stored in the character information storage unit 115, and a blank list of line information is stored in the line information storage unit 135. It is noted that as described above, Tm (m is any integer from 1 to 18) indicates a character in any language in FIG. 3. Further, the rectangle surrounding Tm indicates a character region of Tm, and the numeral just above or below Tm indicates the reading order of characters assigned to the Tm (a list order of the list of character information).

First, the line-box candidate creation unit 125 initializes a line box candidate 400 with character region data of the character information of T1 which is firstly read out from the list of character information (see FIG. 4(a)). Next, the line-box candidate creation unit 125 expands the current line box candidate 400 to a minimum rectangle which further includes the character region data of the second character information of T2 which is read out next, assuming it to be a current line box candidate 402 (see FIG. 4(b)). In this occasion, the line-box candidate creation unit 125 determines an alignment direction 403 of characters in the line box candidate 402 based on the character region data of the character information of T1 and T2 which are read out firstly and secondly.

Next, the line-box candidate creation unit 125 successively expands the line box candidate 402 into a minimum line box further containing the current character region until a current character region becomes absent in the determined alignment direction 403 of characters, thereby obtaining a line box candidate 404 (see FIG. 4(c)). Next, the line-box candidate creation unit 125 reads out next character information, that is, character region data of T10 as a current character region and detects that the character region data of T10 is in a different direction 406 from the alignment direction 403 of characters (see the arrow 406 in FIG. 4(c)).

The above described detection is directed to the line information registration unit 130 from the line-box candidate creation unit 125, and the line information registration unit 130 registers the alignment direction 403 of characters corresponding to the current line box candidate 404 as line information to the list of line information in the line information storage unit 135. The line-box candidate creation unit 125 also repeats the processing similar to the processing from FIG. 4(a) to FIG. 4(d) until character information becomes absent in the list of character information, assuming that the character region data of T10 is the character region data at the head of the list of character information (see FIG. 4(d)). The list of line information is completed at the same time when the processing ends.

The modification unit 105 reads out character information and corresponding image data respectively from the image data storage unit 110 and the character information storage unit 115, and outputs them to an output unit such as a display not shown, etc. enabling a user to confirm the presence or absence of an error of character recognition by comparing the original image with the result of character recognition by OCR. The modification unit 105 also receives an instruction to modify character information from a user via an input unit such as a keyboard not shown, etc., when the user finds an error of character recognition.

The modification of error of character recognition can be any of the integration, division, and insertion of a character region. When the modification is the integration and division of a character region, the instruction of modification will be the deletion of existing character information and the addition of character information in place of the character information to be deleted. On the other hand, when the modification is the insertion of a character region, the instruction of modification will be the addition of character information.

In any case where the instruction to modify character information is the integration, division, or insertion of a character region, the modification unit 105 receives text data of a character to be added and corresponding character region data from a user via an input unit. The modification unit 105 adds the received character information at the head or the tail end of the list of character information. For this reason, the reading order of characters needs to be determined again by the decompression processing unit 140 described below after modification is performed on the list of character information. The modification unit 105 can directly deliver the character information to be added, which is received from the user, to the decompression processing unit 140 without adding it to the list of character information.

It is noted that when the instruction to modify character information is the integration and division of a character region, there will be no need of modifying the reading order of characters if the character information to be added is inserted into the position of character information, which is to be deleted from the list of character information for integration or division. On the other hand, if it is configured such that the character information is always added at the head or the tail end of the list of character information, or it is always directly delivered to the decompression processing unit 140, there is no need of changing the processing depending on details of modification. Whichever configuration is adopted, it is necessary to modify the reading order of characters in the case of a modification by insertion of a character region.

The decompression processing unit 140 determines the reading order of characters of the list of character information to be stored in the character information storage unit 115 by using the list of line information in response to a modification request on the list of character information. As described above, the decompression processing unit 140 can receive the notification to add character information at the head or the tail end of the list of character information from the modification unit 105, or can be receive the character information itself to be added from the modification unit 105.

The decompression processing unit 140 more specifically includes a detection unit 145, a subset determination unit 150, a rearrangement unit 155, and an order determination unit 160. The detection unit 145 detects a line box containing the region indicated by the character region data of the character information to be added, from the list of line information to be stored in the line information storage unit 135 in response to a request for adding character information to the list of character information.

The subset determination unit 150 obtains a subset of character region data consisting of all the character region data indicating the region contained in a line box detected by the detection unit 145 from the list of character information to be stored in the character information storage unit 115. It is noted that when character information to be added is directly delivered to the decompression processing unit 140, the subset determination unit 150 includes the character region data of the character information to be added, in the subset of the obtained character region data.

The rearrangement unit 155 rearranges each character region data in the subset obtained by the subset determination unit 150 according to the position with respect to the alignment direction of characters corresponding to the detected line box. To be more specific, the rearrangement unit 155 rearranges each character region data in the subset according to the position of center point coordinates of the region indicated by each character region data with respect to the alignment direction of characters corresponding to the detected line box.

The order determination unit 160 updates the list of character information to be stored in the character information storage unit 115 according to the alignment order of character region data pertaining to the subset determined by the rearrangement unit 155. Specifically, the order determination unit 160 determines the insertion position of character information to be added by the alignment order of character region data pertaining to the subset determined by the rearrangement unit 155, and inserts the character information to be added to the determined insertion position thereby updating the list of character information. As a result, a new reading order of characters in the list of character information is determined.

Figure 5:
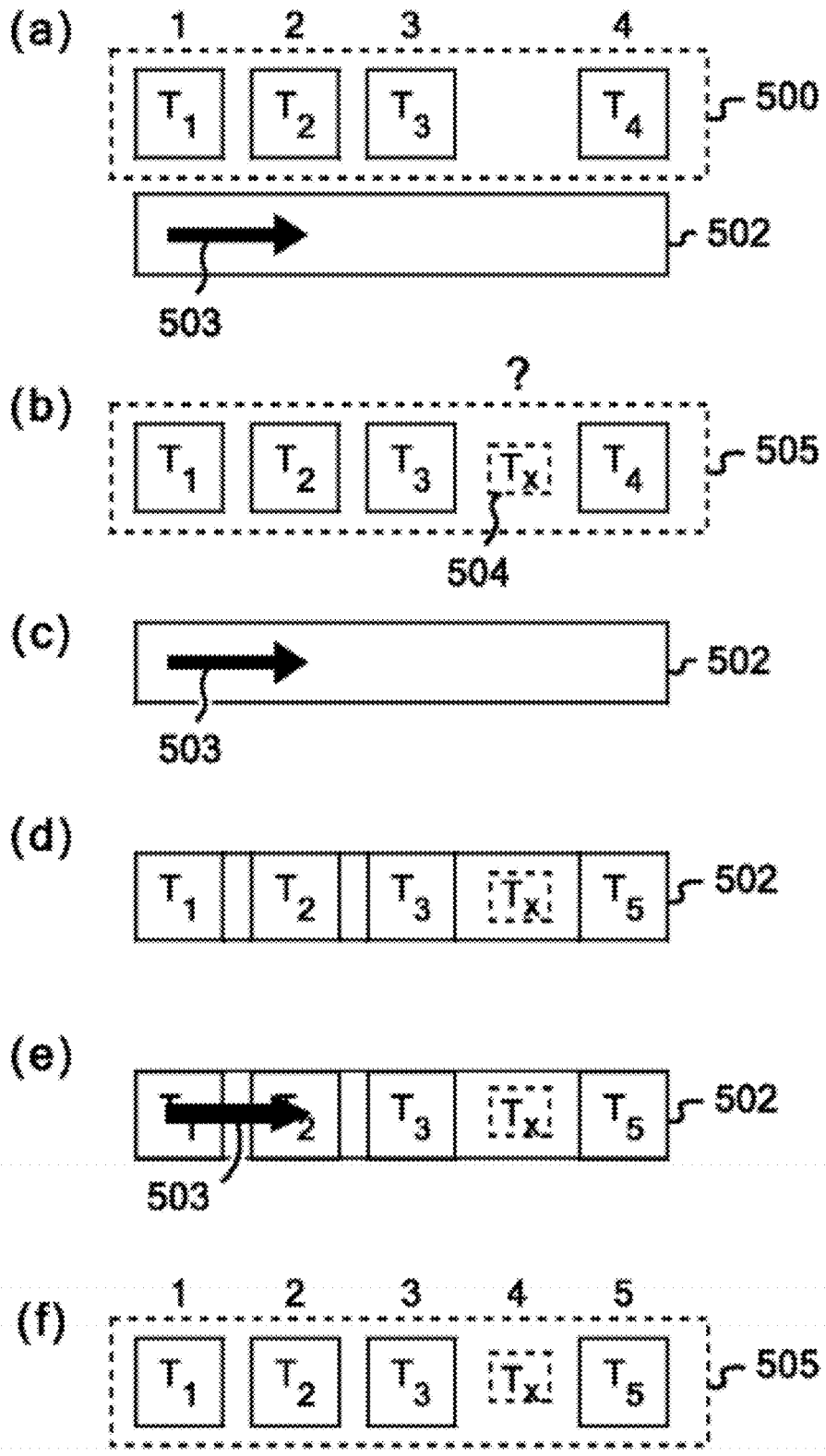
FIGS. 5(a) to 5(f) respectively are explanatory diagrams of each step of a decompression process when a character region is newly added.

Referring to FIG. 5, an outline of the decompression processing by the above described each component of the decompression processing unit 140 will be described. FIG. 5 shows each step of decompression process. At the start of processing, it is assumed that the list of character information including character information of T1, T2, 3, and T4 extracted from the image data 500 is stored in the character information storage unit 115 (see FIG. 5(a)). It is also assumed that the line information storage unit 135 stores a list of line information including line information made up of a line box 502 which is a minimum rectangle that surrounds character regions of T1, T2, T3, and T4, and an alignment direction 503 of characters in the line box 502 (see FIG. 5(a)). It is noted that a numeral listed just above each character in the image data 500 shown in FIG. 5(a) indicates the reading order of characters assigned to each character (a list order of the list of character information).

In such a situation, it is supposed that a user instructs a modification to newly insert character TX 504 between characters T3 and T4 to correct an error of character recognition (see FIG. 5(b)). As described above, the information to be inputted from the user as the instruction of modification only includes the text data of character TX 504 and the character region data thereof. It is not known at which position of the list of character information character TX 504 is to be inserted, and the reading order of characters needs to be determined over again. The detection unit 145 first searches the list of line information to acquire a line box 502 that contains the character region of the added character TX 504 and a corresponding alignment direction 503 of characters (see FIG. 5(c)).

The subset determination unit 150 reads out all of the character region data indicating the region contained in the line box 502 detected by the detection unit 145 from the list of character information (see FIG. 5(d)). The rearrangement unit 155 then rearranges all the character region data read out from the subset determination unit 150, according to the position of the center coordinates of each character region data with respect to the alignment direction 503 of characters detected by the detection unit 145 (FIG. 5(e)). Then, the reading order of characters is correctly determined with respect to the subset of character region data (FIG. 5(f)), and consequently the position at which the character information of character TX 504 is inserted into the list of character information (between the characters T3 and T4, and at the fourth position in the list) is identified. By determining the alignment order of characters regarding the line box including the character region of an added character, it is possible to determine a proper reading order of characters pertaining to the entire list of character information.

Figure 6:
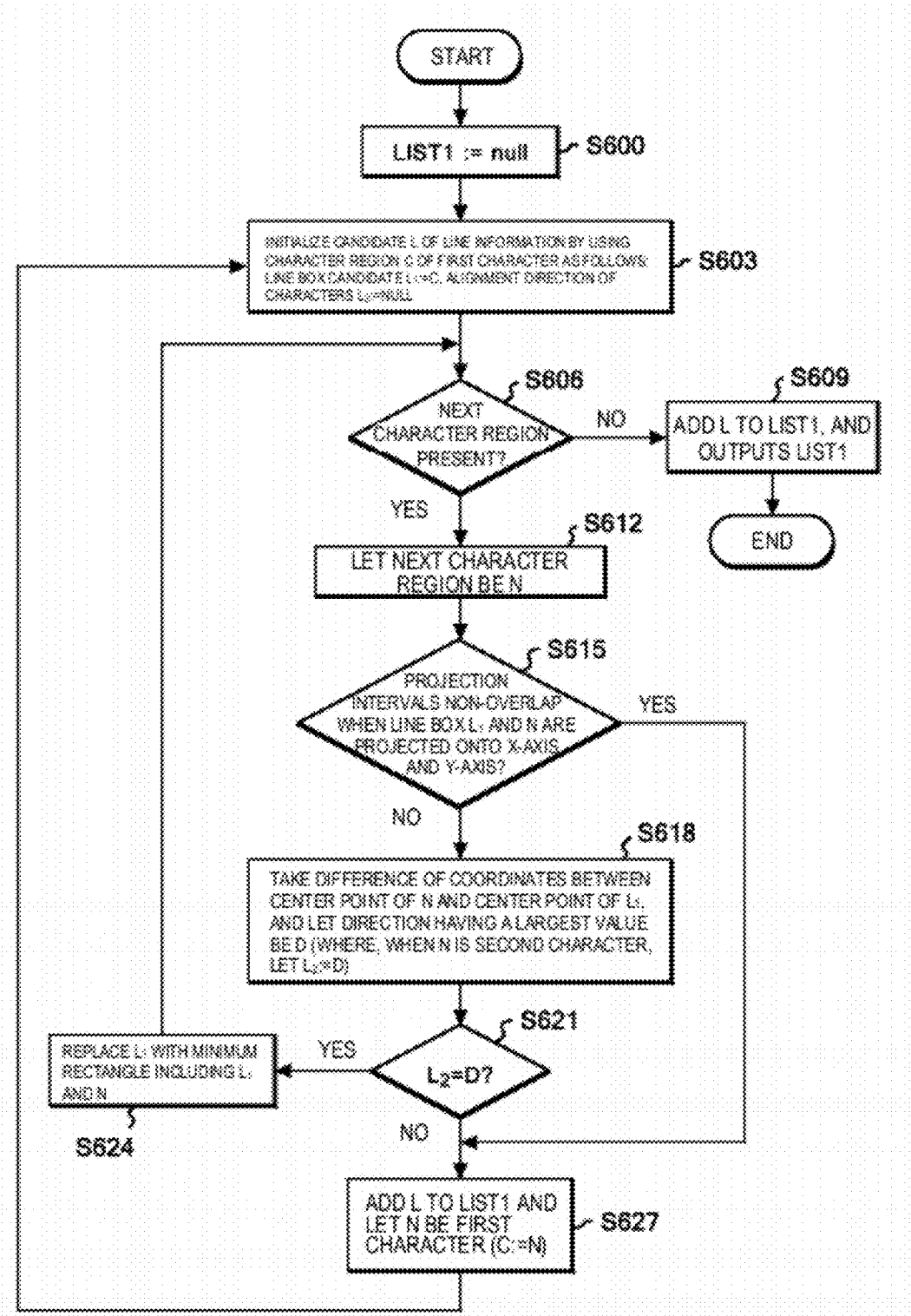
FIG. 6 shows an example of a general flow of the processing by a compression processing unit.
Figure 7:
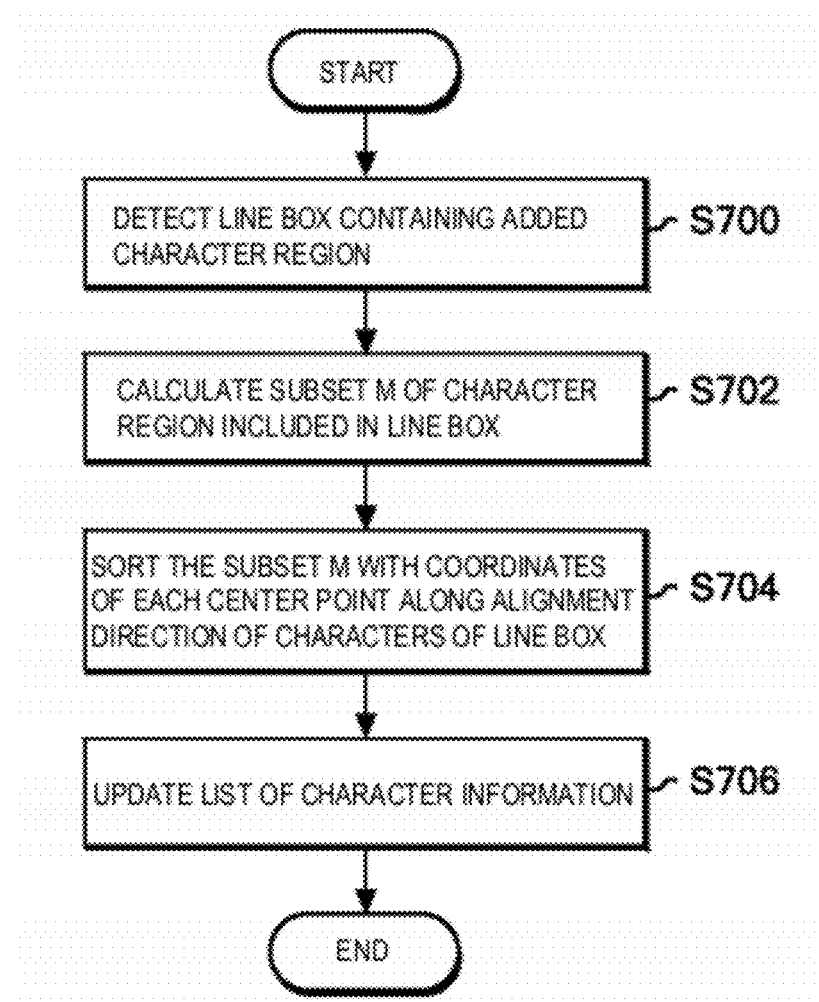
FIG. 7 shows an example of a general flow of the processing by a decompression processing unit.

Referring to FIGS. 6 and 7, the flow of processing by a reading order determination apparatus 100 relating to a first embodiment of the present invention will be described. FIG. 6 is a flowchart to show an example of the flow of compression processing according to the compression processing unit 120. FIG. 7 is a flowchart to show an example of the flow of decompression processing according to the decompression processing unit 140. First, referring to FIG. 6, the flow of compression processing according to the compression processing unit 120 will be described.

In FIG. 6, the compression processing starts at step 600, and the line information registration unit 130 prepares a list LIST1 of line information in which line information is to be registered in the alignment order of lines, and sets null thereto for initialization. Further, the line-box candidate creation unit 125 reads out a character region C of the first character from the head of the list of character information to be stored in the character information storage unit 115 to set it to a line box candidate L1, and sets null to an alignment direction L2 of characters corresponding to the line box candidate L1 to initialize a candidate L of line information (step 603).

The line-box candidate creation unit 125 judges whether or not a next character region is present in the character information storage unit 115 (step 606). If all the character information to be listed in the list of character information is read out (step 606: NO), the control moves from the line-box candidate creation unit 125 to the line information registration unit 130, and the line information registration unit 130 registers a candidate L of current line information to a list LIST1 of line information and outputs LIST1 (step 609). Then, the process ends.

When a next character region is present at step 606 (step 606: YES), the line-box candidate creation unit 125 lets the next character region be N (step 612). Next, the line-box candidate creation unit 125 projects a line box candidate L1 and the next character region N to X-axis and Y-axis respectively, and judges if projection intervals do not overlap in either case where the projection is performed onto X-axis or Y-axis (step 615). This is to avoid that a character which is not aligned along X-axis or Y-axis such as a character in the next line is included in the same line box.

When the projection intervals overlap (step 615: NO), the line-box candidate creation unit 125 obtains a difference of coordinates (x1−x2, y1−y2) between the center point (x1, y1) of the line box candidate L1 and the center point (x2, y2) of the next character region N to obtain a unit vector D ((0, 1) or (1, 0)) that points to a direction of the axis having a large absolute value of difference (max(|x1−x2|, |y1−y2|)) (step 618). When the next character region N is the character region of the second character that follows the current character region C of the first character, the alignment direction L2 of characters is set to D. The line-box candidate creation unit 125 judges whether or not the alignment direction L2 of characters is equal to the unit vector D (step 621).

When the alignment direction L2 of characters is equal to the unit vector D (step 621: YES), the line-box candidate creation unit 125 replaces the line box candidate L1 with a minimum rectangle that includes the line box candidate L1 and the next character region N (step 624). The process returns to step 606, and the line-box candidate creation unit 125 repeats the series of processing. On the other hand, when the alignment direction L2 of characters is not equal to the unit vector D (step 621: NO), the control moves from the line-box candidate creation unit 125 to the line information registration unit 130, and the line information registration unit 130 adds a current candidate L of line information to the tail end of the list LIST1 of line information, and sets the next character region N, which follows the current one, to the current character region C of the first character to regard N as the first character of the list of character information (step 627). Then, the process returns to step 603, and the line-box candidate creation unit 125 repeats a series of the processing.

Referring to FIG. 7, the flow of decompression processing will be described. In FIG. 7, decompression processing starts at step 700, and the detection unit 145 detects line information made up of alignment direction of characters corresponding to the line box containing the region indicated by the character region data of added character information, from the list of line information to be stored in the line information storage 135, in response to addition of character information to the list of character information. The subset determination unit 150 receives line information from the detection unit 145, and obtains a subset M of character region data indicating the region contained in the line box of the line information from the list of character information to be stored in the character information storage unit 115 (step 702).

The rearrangement unit 155 receives the subset M of the character region data and line information from the subset determination unit 150, and rearranges each character region data making up the subset M according to the position of region of each character region data with respect to the alignment direction of characters of the received line information (step 704). Lastly, the order determination unit 160 updates the list of character information to be stored in the character information storage unit 115 based on the alignment order of characters determined pertaining to the subset M of character region data, and newly determine the reading order of characters (step 706). Then, the process ends.

Example 2

In Example 1 described above, the decompression processing unit 140 performs decompression processing in response to a modification request on the list of character information to determine the reading order of characters. However, the decompression processing by the decompression processing unit 140 can be performed at the timing of reading out the list of character information from the character information storage unit 115. Thus, the case where this configuration is adopted will be described below as Example 2.

Figure 8:
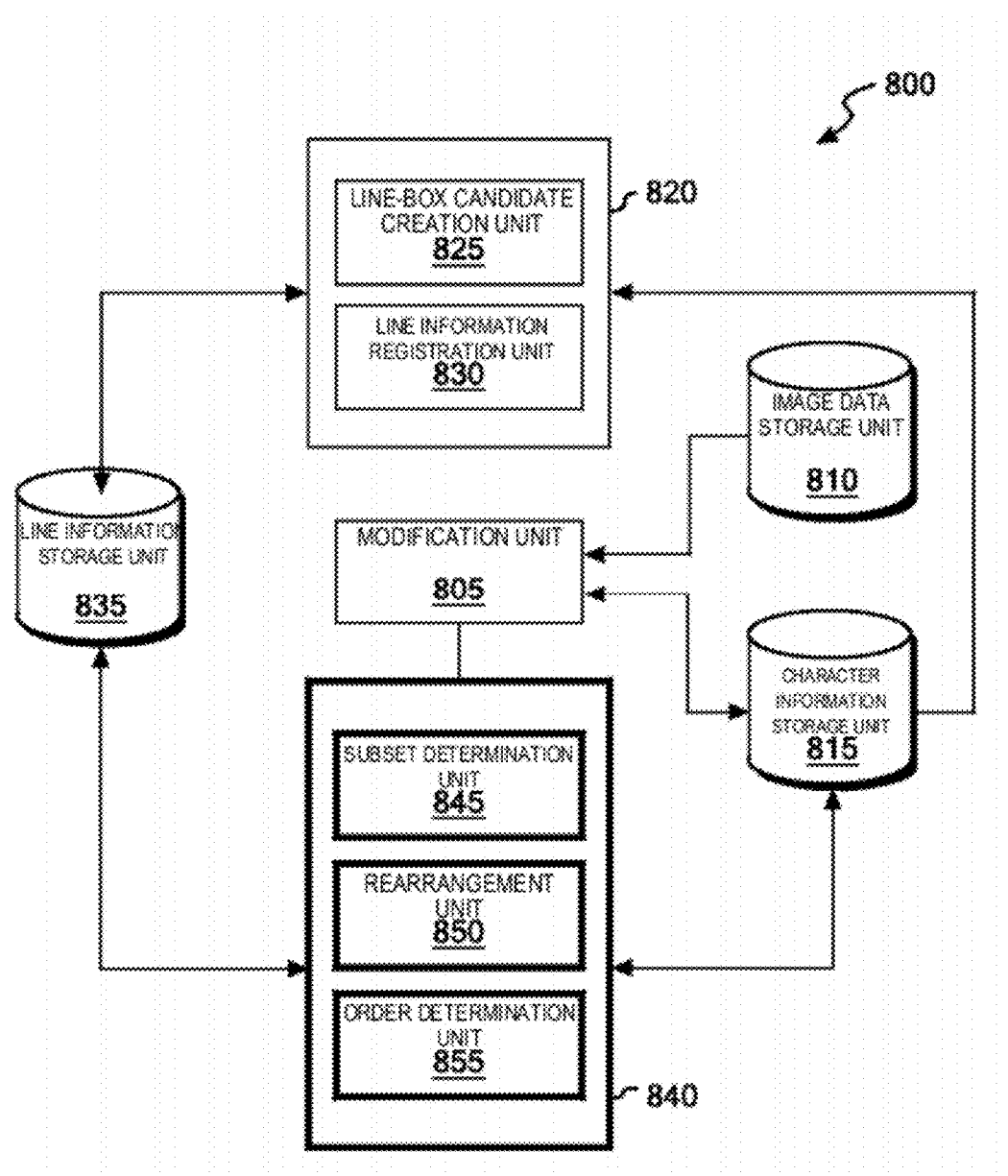
FIG. 8 shows an example of the functional configuration of a reading order determination apparatus relating to an embodiment of the present invention.

FIG. 8 shows an example of the functional configuration of a reading order determination apparatus 800 relating to Example 2 of the present invention. The reading order determination apparatus 800 includes an image data storage unit 810 for storing image data which is converted into electronic data by a scanner, a character information storage unit 815 for storing the list of character information extracted from image data by OCR, a compression processing unit 820 for creating line information from the list of character information, a line information storage unit 835 for storing created line information, a modification unit 805 for enabling the comparison between the image data and character information to allow a user to modify the result of character recognition processing by OCR, and a decompression processing unit 840 for determining the reading order of characters of the set of character information to be stored in the character information storage unit 815 by using line information.

Since the above described each component of a reading order determination apparatus 800 relating to Example 2 do not differ from the components corresponding to the reading order determination apparatus 100 relating to Example 1 excepting a decompression processing unit 840, hereafter, description will be made on only the decompression processing unit 840. It is noted that in Example 2, since every time when the list of character information is read out from the character information storage unit 815, decompression processing by the decompression processing unit 840 is performed to determine the reading order of characters, the list of character information stored in the character information storage unit 815 can not necessarily be aligned in the reading order of characters. The decompression processing unit 840 relating to Example 2 includes a subset determination unit 845, a rearrangement unit 850, and an order determination unit 855.

The subset determination unit 845 reads out line information in order from the head of the list of line information stored in the line information storage 835 in response to the reading out of the list of character information from the character information storage unit 115 and obtains the subset of all the character region data that indicates regions contained in the line box of the read-out line information from the list of character information to be stored in the character information storage unit 810. At this moment, the subset determination unit 845 confirms whether or not character region data, which is included in the subset of character region data obtained for the line box read out prior to the line box currently being processed, is present in the subset of obtained character region data. When such character region data is present, the subset determination unit 845 deletes the character region data, which is commonly included, from the subset of current character region data. Such processing is for the purpose of solving problems of the reading order determination processing of characters in a case where one character region is included in two line boxes.

Figure 9:
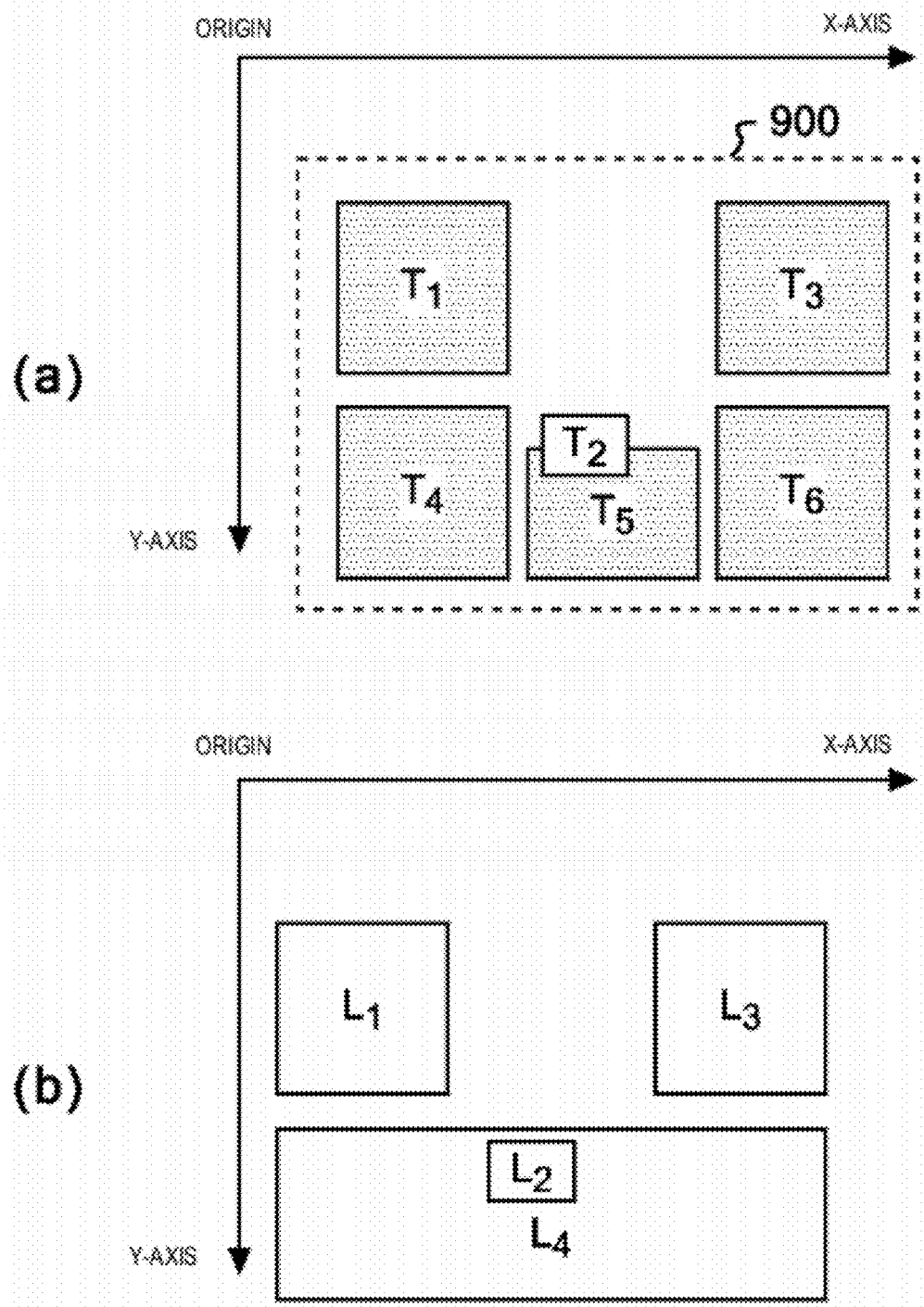
FIG. 9(a) shows another example of character image data.
FIG. 9(b) shows a line box corresponding to the character image data shown in FIG. 9(b)

Referring to FIG. 9, a case where one character region is included in two line boxes will be specifically described. FIG. 9(*a*) shows image data of a set of characters 900 of characters T1 to T6, and FIG. 9(*b*) shows line boxes corresponding to the set of characters 900. The subscript of a character represents the reading order of the character. As shown in FIG. 9(*a*), since the character region of the second character T2 is displaced in Y-axis direction and does not overlap with either of the character regions of the characters T1 and T3 when projected onto Y-axis, the line boxes corresponding to the characters T1 to T3 are formed into single character line boxes L1, T2, and L3, respectively as shown in FIG. 9(*b*). On the other hand, since characters T4 to T6 are continuously aligned in X-axis direction, a corresponding line box is one line box L4 including character regions of the characters T4 to T6. Due to the displacement of the character region, the character region of character T2 has been included not only in a line box L2 in which it is originally to be included, but also in a line box L4.

If the reading order of characters is determined by using line information in such a situation, a list of character information in which character T2 appears twice will be created. In order to solve this, it is effective to delete the character region of character T2, which is commonly included in the line box L2 previously processed, from the set of character regions included in the line box L4 when rearranging characters by using the line box L4. Accordingly, in the subset determination unit 845 relating to Embodiment 2, it is judged whether or not a character region data, which is commonly included in both the subset of character region data currently being processed and the subset of previously obtained character region data, is present, and when there is commonly included character region data, it is configured to delete that from the subset of the character region data currently being processed. The subset of character region data for each line information finally obtained by the subset determination unit 845 is delivered along with corresponding line information to the rearrangement unit 850 described below.

The rearrangement unit 850 receives a pair of line information and a corresponding subset of character region data from the subset determination unit 845 in the alignment order of lines in the list of line information. Then, the rearrangement unit 850 rearranges each character region data of corresponding subset for each line information according to the position with respect to the corresponding alignment direction of characters. To be more specific, the rearrangement unit 850 rearranges each character region data in the subset according to the position of the center point coordinates of the region indicated by each character region data with respect to the corresponding alignment direction of characters.

The order determination unit 855 receives line information and rearranged character region data of the corresponding subset from the rearrangement unit 850 in the alignment order of lines in the list of line information. Then, the order determination unit 855 joins subsets of rearranged character region data for each line information together in the alignment order of lines to create a list of character region data, and determines the list order of the concerned list as the reading order of characters pertaining to the list of character information.

Figure 10:
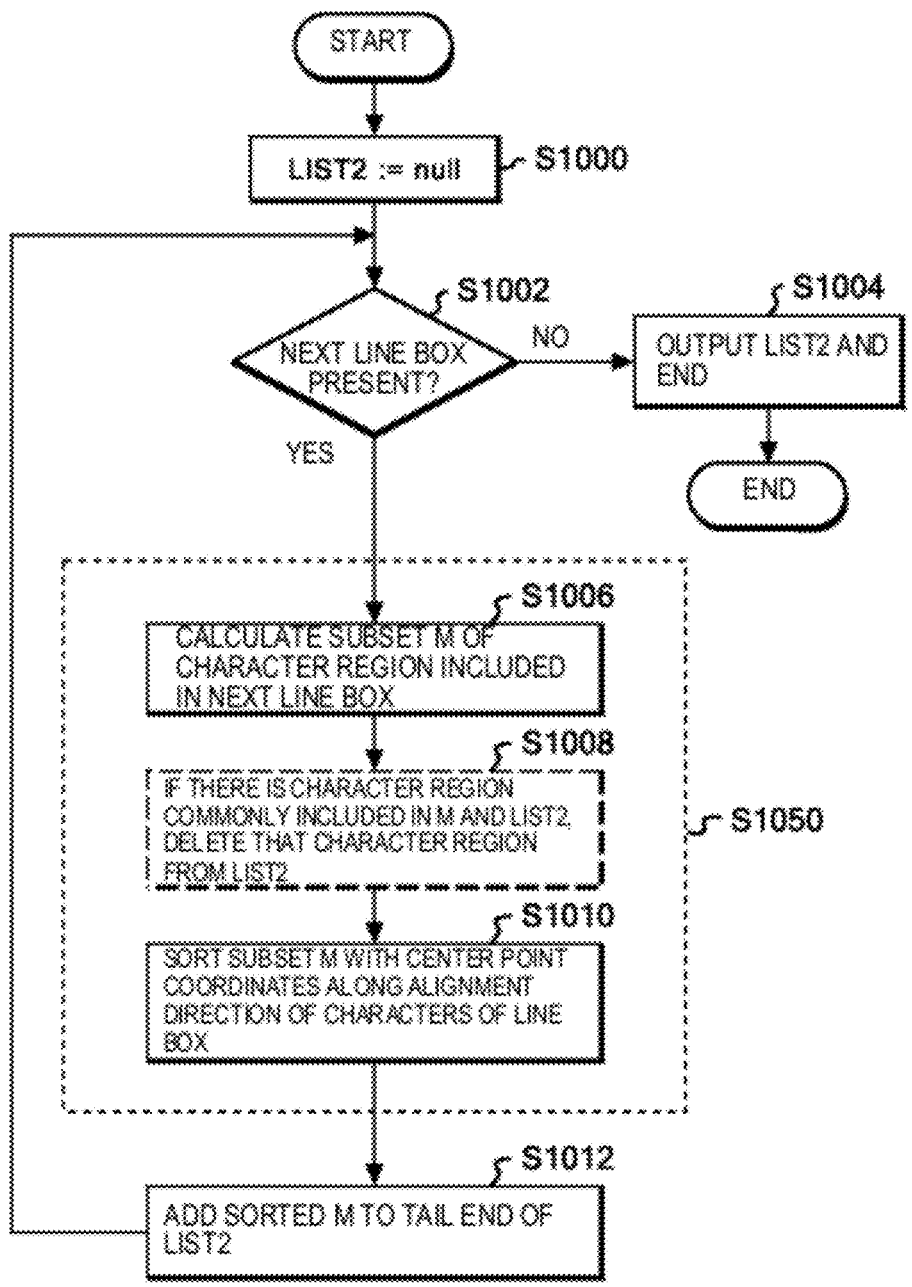
FIG. 10 shows an example of a general flow of the processing by a decompression processing unit.

Referring to FIG. 10, the flow of decompression processing by the decompression processing unit 840 will be described. In FIG. 10, the decompression processing starts at step 1000, and the order determination unit 855 prepares a list LIST2 for registering character region data in the reading order of characters, and sets null thereto for initialization. The control moves from the order determination unit 855 to the subset determination unit 845, and the subset determination unit 845 reads out line information in list order from the list of line information stored in the line information storage 835 to judge whether or not the next line information to be read out is present in the list of line information (step 1002). When the next line information to be read out is not present in the list of line information (step 1002: NO), the control returns to the order determination unit 855, and the order determination unit 855 outputs a current list LIST2. Thereafter, the process ends.

On the other hand, next line information to be read out is present in the list of line information (step 1002: YES), the subset determination unit 845 obtains a subset M of all character region data indicating regions contained in the next line box of line information, which has been read out, from the list of character information stored in the character information storage unit 810 (step 1006). Next, the subset determination unit 845 confirms whether or not character region data which is registered in the current list LIST2 is included in the obtained subset M of character region data, and when it is included, deletes the commonly included character region data from the subset M (step 1008). As described above, such a processing is for the purpose of solving problems in the determination processing of reading order of characters in a case where one character region is included in two line boxes.

After the processing of step 1008, the subset M of character region data is delivered along with corresponding line information to the rearrangement unit 850, and the rearrangement unit 850 rearranges each character region data constituting the subset M according to the position of the region of each character region data with respect to the alignment direction of characters (step 1010). Next, the order determination unit 855 adds the subset M of character region data which is rearranged by the rearrangement unit 850 to the tail end of the list LIST2 (step 1012). Thereafter, the process returns to step 1002, and the series of processing is repeated.

Example 3

The problem, which has been described in association with the decompression processing relating to Example 2, that one character region is included in two line boxes can occur in any language. Apart from this, there is a problem that a certain character region is included in a previously determined line box or in a current line box candidate, which is a problem peculiar to Japanese language. Thus, a configuration to cope with such problem will be described below as Example 3.

Figure 11:
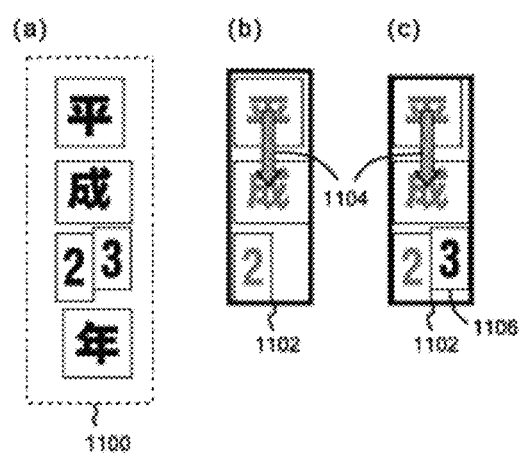
FIGS. 11(a) to 11(c) respectively show each step of a compression process when the character region to be processed is contained in an existing line box.

Referring to FIG. 11, a problem when the reading order of characters is determined by using a line box which includes a character region that has been processed after it is created. FIG. 11(a) shows image data 1100 of a character string "Hei Sei 23 Nen (a Japanese Kanji string in which Japanese Kanji words are arranged in this order in FIG. 11(a))" which includes a two-digit numeral and is written vertically. Now consider to create a line box by a compression method described as Example 1 for the list of character information (the list order is Hei, Sei, 2, 3, and Nen) extracted from the image data 1100.

It is noted that numeral '23' is recognized as two characters '2' and '3' in character recognition processing by OCR. Moreover, it is noted that the character region of '3' is closer to the character region of 'Sei' than the character region of '2'. Then, at time when '2' is read out from the list of character information, a line box candidate 1102 shown in FIG. 11(b) is determined to be the current line box candidate. Next, expansion of the line box candidate, from which numeral '3' is read out, is studied. But, as shown in FIG. 11(c), numeral '3' is already contained in the current line box candidate 1102.

It is assumed that the current line box candidate 1102 is adopted as a line box as is. Upon determining the alignment order of characters based on the line box candidate 1102 and the corresponding alignment direction 1104 of characters at the time of decompression, since the character region of '3' is closer to the character region of 'Sei' than the character region of '2' as described above, it is inevitable that a character string is created in the order of 'Hei', 'Sei', '3', and '2'. Accordingly, in Example 3, the compression processing unit 120 relating to Example 1 is improved such that when a certain character region is included in a previously determined line box or a current line box candidate, the previously determined line box or the current line box candidate is modified so as not to include the certain character. Hereafter, referring to FIG. 12, a reading order determination apparatus 1200 relating to Example 3 will be described.

Figure 12:
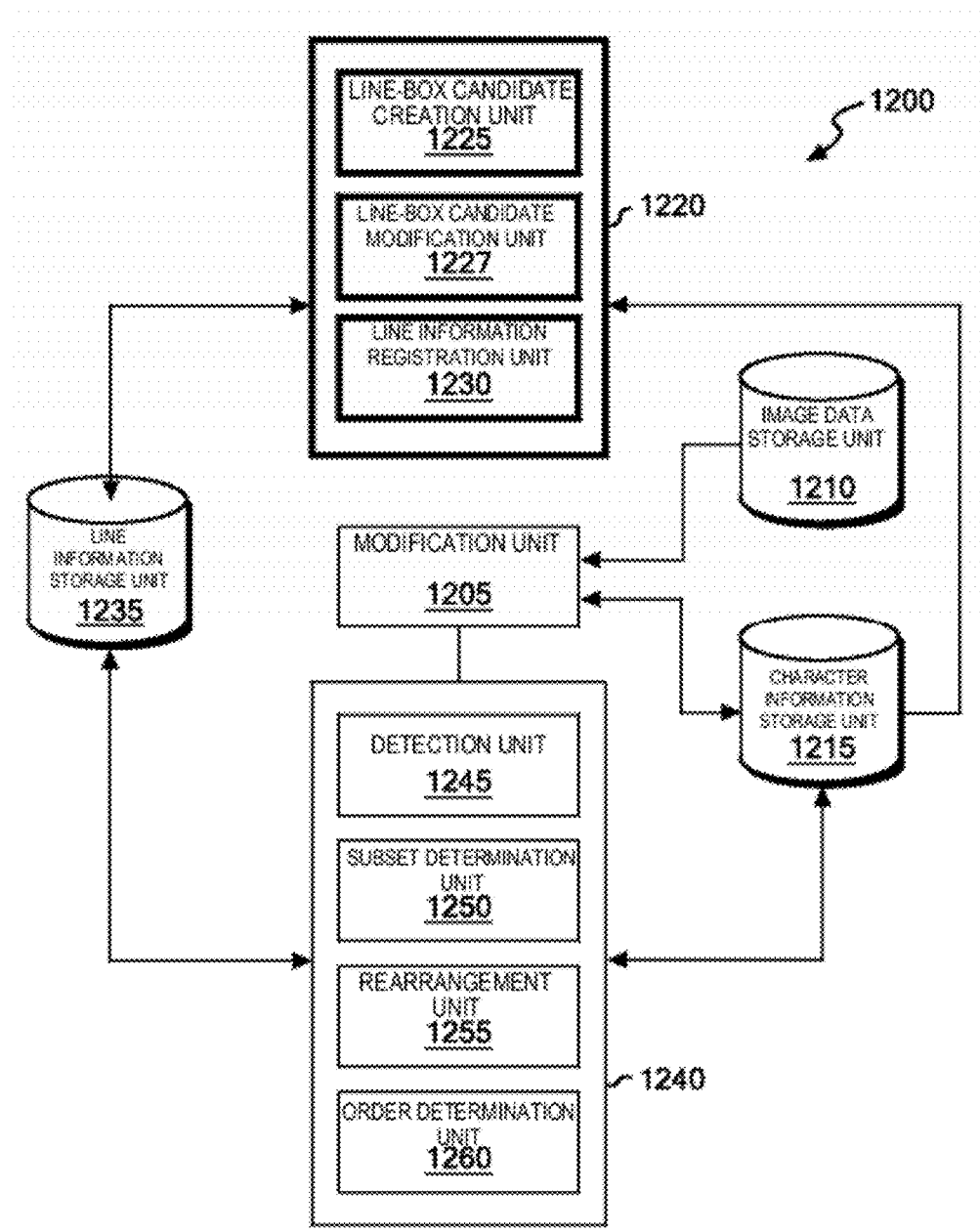
FIG. 12 shows an example of the functional configuration of a reading order determination apparatus relating to an embodiment of the present invention.

FIG. 12 shows an example of the functional configuration of a reading order determination apparatus 1200 relating to Example 3 of the present invention. The reading order determination apparatus 1200 includes an image data storage unit 1210 for storing image data which is converted into electronic data by a scanner, a character information storage unit 1215 for storing the list of character information extracted from image data by OCR, a compression processing unit 1220 for creating line information from the list of character information, a line information storage unit 1235 for storing the created line information, a modification unit 1205 for displaying the image data and character information enabling the comparison therebetween and allowing a user to modify the result of character recognition processing by OCR, and a decompression processing unit 1240 for determining the reading order of characters of the set of character information to be stored in the character information storage unit 1215 by using line information.

Since the above described each component of the reading order determination apparatus 1200 relating to Example 3 do not differ from the components corresponding to the reading order determination apparatus 100 relating to Example 1 excepting a compression processing unit 1220, hereafter, description will be made only on the compression processing unit 1220. Note that it is needless to say that the decompression processing unit 840 relating to Example 2 can be adopted in place of the decompression processing unit 1240. The compression processing unit 1220 relating Example 3 includes a line-box candidate creation unit 1225, a line-box candidate modification unit 1227, and a line information registration unit 1230.

The line-box candidate creation 1225 reads out character region data in order from the head of the list of character information to be stored in the character information storage unit 1215 to assume it as a current character region, and initializes the line box candidate with the first character region data. The line-box candidate creation unit 1225 also determines the alignment direction of characters in the line box candidate with the first two character region data. Then, the line-box candidate creation unit 1225 expands the line box candidate to a minimum line box further containing the current character region until the current character region becomes absent in the determined alignment direction of characters.

In Example 3, however, the line-box candidate creation 1225 will not perform expansion processing, and calls out the line-box candidate modification unit 1227 to be described below to acquire a part of the result of modification processing therefrom when the current character region is contained in a current line box candidate or a line box candidate which is determined as a line box in the past. Upon receiving a part of the modification result from the line-box candidate modification unit 1227, the line-box candidate creation unit 1225 initializes the line box candidate with the received part of modification result, and repeats the series of processing described above. When the current character region becomes absent in the alignment direction of characters, the line-box candidate creation unit 1225 regards the current character region as the character region data at the head of the list of character information, and repeats the series of processing described above.

The line-box candidate modification unit 1227 performs the following modification processing 1 to 3 on a line box candidate (the current line box candidate or a line box candidate which is determined to be a line box in the past) that contains the current character region in response to the call-up from the line-box candidate creation unit 1225. The line-box candidate modification unit 1227 divides the line box candidate to be modified vertically with respect to the corresponding alignment direction of characters and with reference to the center point of a current character region (modification processing 1).

Next, the line-box candidate modification unit 1227 modifies the line box candidate that contains the character region of at least one of the two line box candidates created by the division into a minimum rectangle that surrounds all the character regions contained (modification processing 2). Next the line-box candidate modification unit 1227 creates a single character line box for each of the character region which becomes not to be contained in either of the two line box candidates after division due to the division, and the current character region (modification processing 3).

One or more line box candidates obtained in the above described modification processing 2 or modification processing 3 is registered to the tail end of the list of line information to be stored in the line information storage unit 1235 by the line-box candidate modification unit 1227 when the line box candidate to be modified which contains a current character region is the current line box candidate. On the other hand, when the line box candidate to be modified which contains a current character region is a line box candidate which is determined to be a line box in the past, the line-box candidate modification unit 1227 replaces one or more line box candidates obtained in modification processing 2 or modification processing 3 with the above described line box candidate, which is determined to be a line box in the past, on the list of line information to be stored in the line information storage unit 1235.

In the registration or the replacement to the above described line information storage unit 1235, the order of one of more line box candidates obtained in modification processing 2 or modification processing 3 is set as follows. A single character line box made up of a current character region is assumed to the tail end. The order of other line box candidates is assumed to be an order which is not inconsistent with the order of characters obtained by a line box before division.

Figure 13:
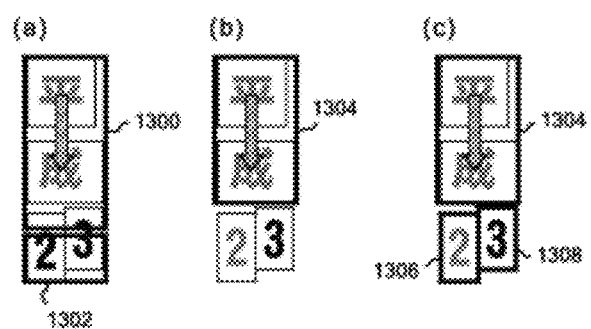
FIGS. 13(a) to 13(c) respectively are explanatory diagrams of each step of an improved compression process when a character region to be processed in contained in an existing line box.

Referring to FIG. 13, the above described modification processing 1 to 3 by the line-box candidate modification unit 1227 will be specifically described. It is supposed that the line-box candidate modification unit 1227 starts the processing by being called up by the line-box candidate creation unit 1225 which creates line information based on the list of character information extracted from the image data 1100 of the character string "Hei Sei 23 Nen" which has been described with reference to FIG. 11. Further, it is supposed that at the time of call-up, the line-box candidate creation unit 1225 has created the line box 1102 shown in FIG. 11(*b*) as a current line box candidate, and has detected that the current character region 1106 is contained in the line box 1102 which is the current line box candidate as shown in FIG. 11(*c*).

FIG. 13(*a*) shows modification processing 1 by the line-box candidate modification unit 1227. The line box 1102 to be modified and shown in FIG. 11(*c*) is divided vertically with respect to the corresponding alignment direction 1104 of characters and with reference to the center point of the current character region 1106, and two line boxes 1300 and 1302 are created as shown in FIG. 13(*a*). FIG. 13(*b*) shows modification processing 2 by the line-box candidate modification unit 1227.

In FIG. 13(*b*), out of the two line boxes 1300 and 1302 which have been created as the result of division, the line box 1300 containing two character regions 'Hei' and 'Sei' is modified to be a line box 1304 which is a minimum rectangle surrounding two character regions 'Hei' and 'Sei' contained therein. FIG. 13(*c*) shows modification processing 3 by the line-box candidate modification unit 1227. In FIG. 13(*c*), single character line boxes 1306 and 1308 are created for each of the two character regions '2' and '3' which have become not contained in either of line boxes 1300 and 1302 after division as the result of division (see FIG. 13(*a*)).

Referring back to FIG. 12, the line information registration unit 1230 prepares a list of line information in the line information storage unit 1235 at the start of compression processing, and initializes it with null. The line information registration unit 1230 also registers the current line box candidate along with the corresponding alignment direction of characters at the tail end of the list of line information which is to be stored in the line information storage unit 1235 as line information every time when it is detected that a current character region is absent in the alignment direction of characters in the expansion processing by the line-box candidate creation unit 1225.

Figure 14:
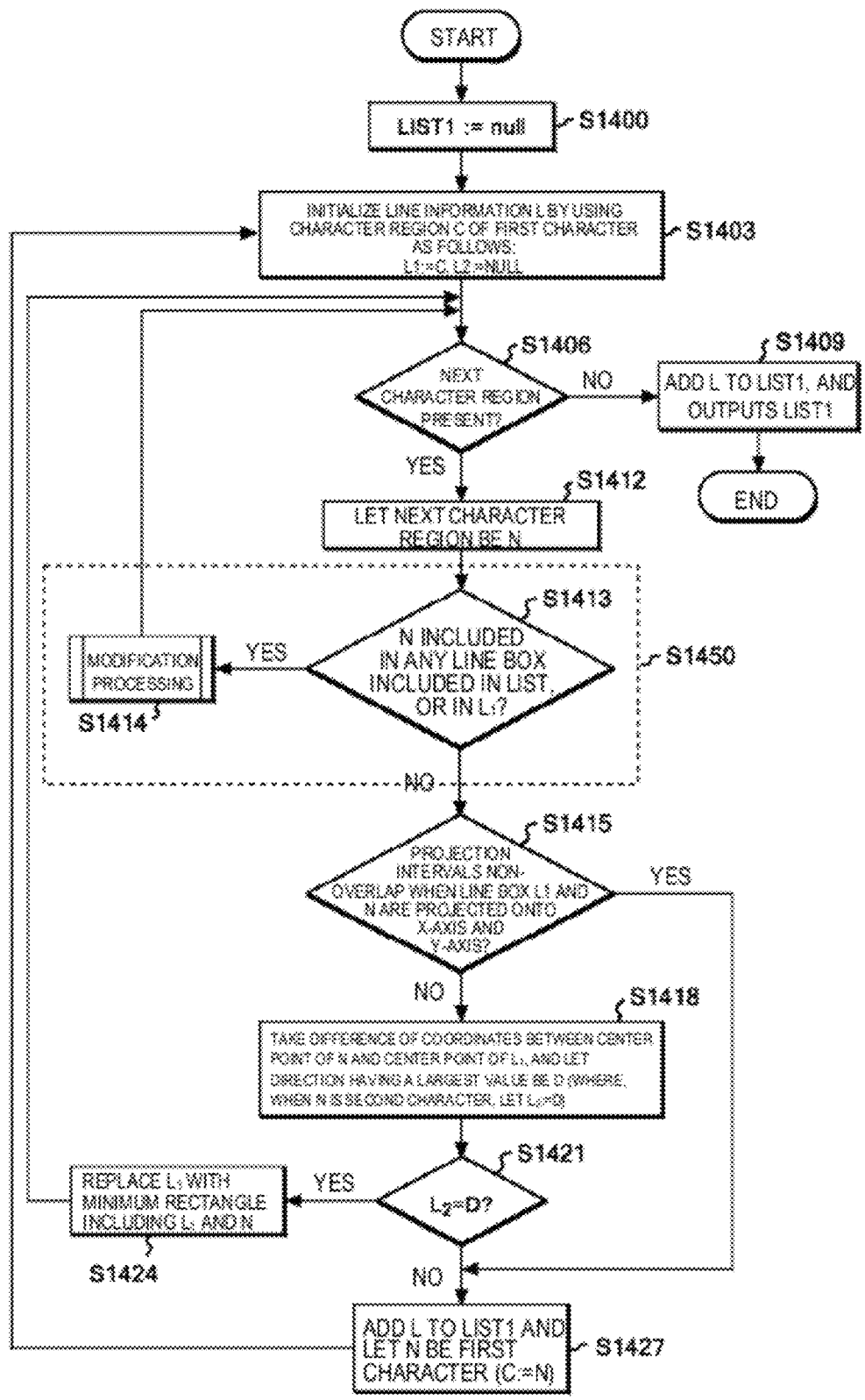
FIG. 14 shows an example of a general flow of the processing by a compression processing unit.
Figure 15:
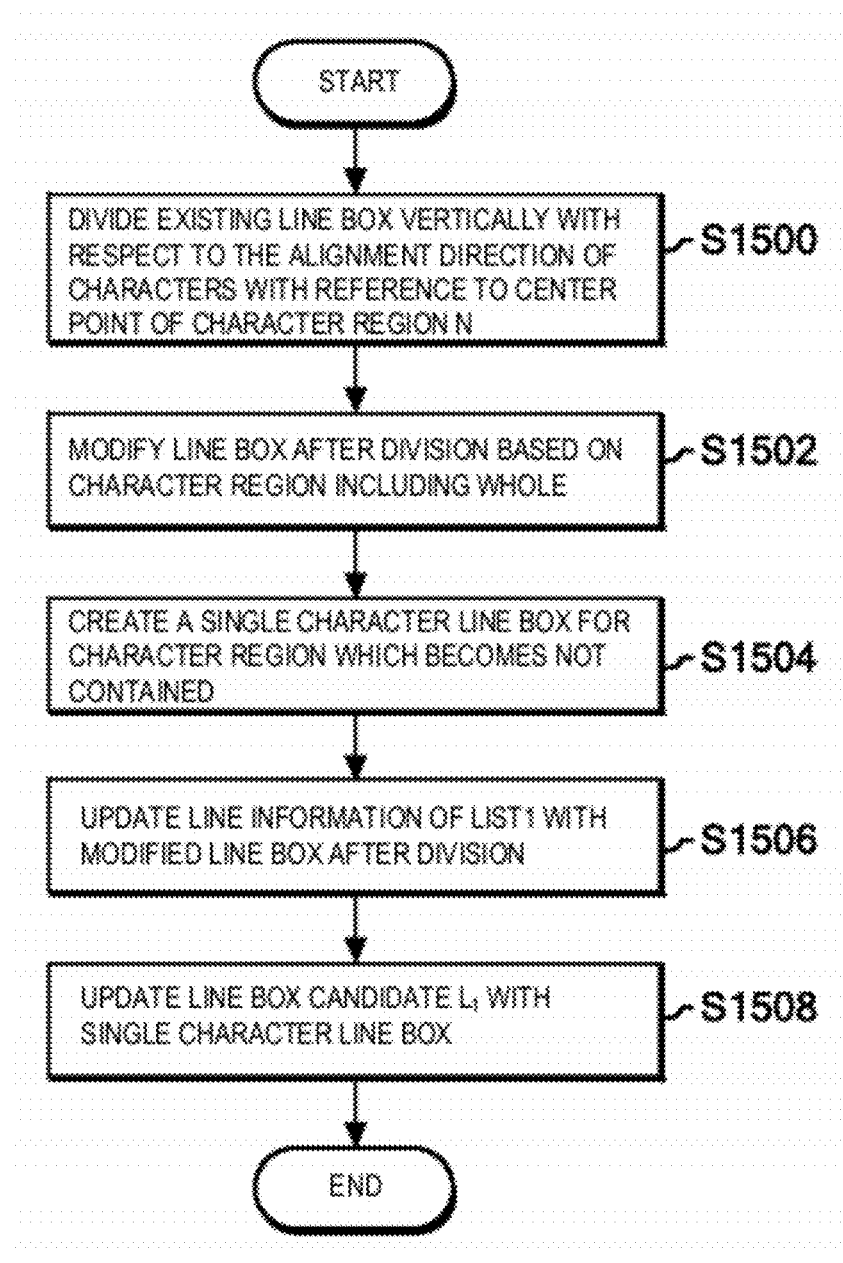
FIG. 15 is a flow chart to show an example of the flow of the modification processing shown in FIG. 14.

Referring to FIGS. 14 and 15, the flow of processing by the compression processing unit 1220 relating to Example 3 will be described. FIG. 14 is a flowchart to show an example of the flow of compression processing by the compression processing unit 1220 relating to Example 3. FIG. 15 is a flowchart to show an example of the flow of modification processing at step 1414 shown in FIG. 14. It is noted that the flowchart shown in FIG. 15 is the same as the flowchart of the compression processing by the compression processing unit 120 relating to Example 1 shown in FIG. 6 excepting that the processing of the portion surrounded by a square 1450 is newly added. Accordingly, description will be made only on the newly added step surrounded by the square 1450.

The processing of step 1413 is performed right after step 1412 corresponding to step 612 of the flowchart shown in FIG. 6, and the line-box candidate creation unit 1225 judges whether or not a next character region N which is read out from the list of character information is contained in a current line box candidate L1 or any of the past line box candidates registered as a line box in the current list LIST1 of line information. When the next character region N is not contained in any line box candidate (step 1413: NO), the process proceeds to step 1415 corresponding to step 615 of the flowchart shown in FIG. 6.

On the other hand, when the next character region N is contained in any line box candidate (step 1413: YES), the process proceeds to step 1414, and the line-box candidate modification unit 1227 performs modification processing to modify the current line box candidate L1 which contains the next character region N or the past line box candidate. Details of the modification processing will be described with reference to FIG. 15. The post processing of the modification processing returns to step 1406.

The modification processing by the line-box candidate modification unit 1227 shown in FIG. 15 starts at step 1500, and the line-box candidate modification unit 1227 divides the existing line box candidate surrounding the character region N vertically with respect to the alignment direction of characters corresponding to the line box candidate with reference to the center point of the character region N. Next, the line-box candidate modification unit 1227 modifies the line box candidate containing one or more character regions, out of the two line box candidates after division, into a minimum line box that surrounds the one or more character regions (step 1502). The line-box candidate modification unit 1227 also creates a single character line box in which the concerned character region is a line box for each character region which has become not contained in either of the two line box candidates after division as the result of division (step 1504).

The line-box candidate modification unit 1227 updates the list LIST1 of line information with the line box candidates after division which has been modified in step 1502 and, if there is any, a single character line box (excepting a single character line box created from the character region N) created in step 1504 (step 1506). Next, the line-box candidate modification unit 1227 updates the line box candidate L1 with a single character line box created from the character region N in step 1504 (step 1508). Then, the process ends.

Example 4

The problem, which has been described relating to Example 3, that a certain character region becomes contained a line box which is previously determined or a current line box candidate can be solved by adopting another configuration different from the configuration of Example 3. Accordingly, such another configuration will be described below as Example 4.

In Example 4, the compression processing unit 120 relating to Example 1 is improved such that the expansion processing to expand a line box candidate to a minimum line box further containing a current character region is performed on condition that the reading order of characters is properly determined based on the line box candidate and the alignment direction of characters which are to be created by expansion. Hereafter, referring to FIG. 16, a reading order determination apparatus 1600 relating to Example 4 will be described.

Figure 16:
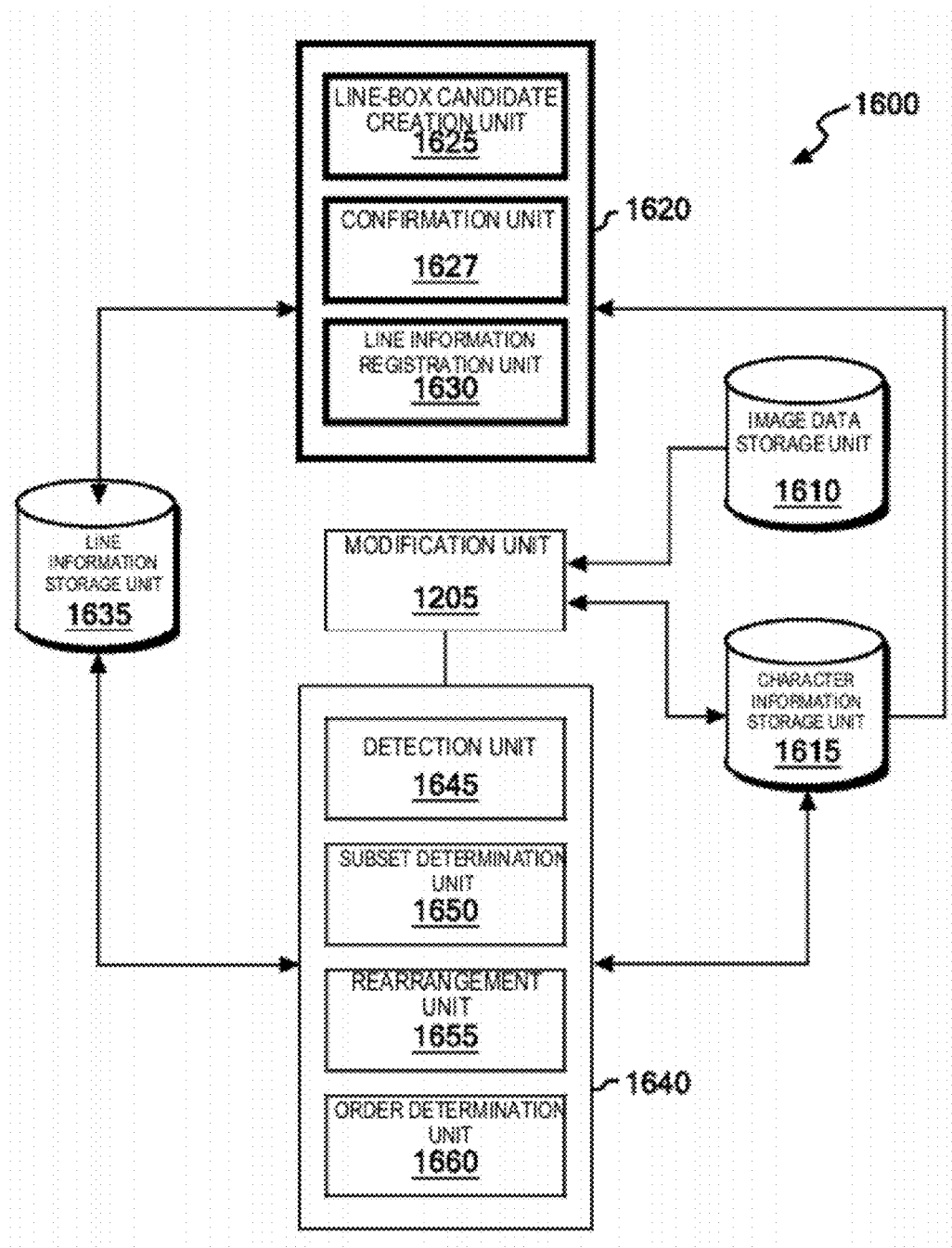
FIG. 16 shows an example of the functional configuration of a reading order determination apparatus relating to an embodiment of the present invention.

FIG. 16 shows an example of the functional configuration of the reading order determination apparatus 1600 relating to Example 4 of the present invention. The reading order determination apparatus 1600 includes an image data storage unit 1610 for storing image data which is converted into electronic data by a scanner, a character information storage unit 1615 for storing a list of character information extracted from the image data by OCR, a compression processing unit 1620 for creating line information from the list of character information, a line information storage unit 1635 for storing the created line information, a modification unit 1605 for enabling the comparison between the image data and the character information to allow a user to modify the result of character recognition processing by OCR, and a decompression processing unit 1640 for determining a reading order of characters of a set of character information to be stored in the character information storage unit 1615 by using line information.

Since the above described each component of the reading order determination apparatus 1600 relating to Example 4 does not differ from the corresponding components of the reading order determination apparatus 100 relating to Example 1 excepting the compression processing unit 1620, only the compression processing unit 1620 will be described hereafter. Note that it is needless to say that the decompression processing unit 840 relating to Example 2 can be adopted in place of the decompression processing unit 1640. The compression processing unit 1620 relating to Example 4 includes a line-box candidate creation 1625, confirmation unit 1627, and a line information registration unit 1630.

The line-box candidate creation 1625 reads out character region data in order from the head of the list of character information to be stored in the character information storage unit 1615 to assume it as a current character region, and initializes the line box candidate with the first character region data. The line-box candidate creation unit 1625 also determines the alignment direction of characters in the line box candidate with the first two character region data. Then the line-box candidate creation unit 1625 executes the expansion processing to expand the line box candidate into a minimum line box that further contains the current character region under a certain condition. The certain condition refers to that confirmation by below described confirmation unit 1627 will succeed, and line-box candidate creation 1625 calls up the confirmation unit 1627 to receive the result of confirmation prior to the expansion processing.

When the confirmation by the confirmation unit 1627 turns out to be success, the line-box candidate creation 1625 executes expansion processing, and repeatedly attempts the expansion processing on the line box candidate after expansion and the current character region which has been read out next until the confirmation result tunes out to be fail. When the confirmation by the confirmation unit 1627 turns out to be fail, line-box candidate creation 1625 regards the current character region as the head of the list of character information, and repeats the above described series of processing.

The confirmation unit 1627 confirms if the reading order of characters is property determined based on a line box candidate that is to be created by expansion and a corresponding alignment direction of characters. The confirmation can be performed as follows. The confirmation unit 1627 first actually executes expansion processing to create a line box candidate, and make it a tentative candidate of line information along with a current alignment direction of characters. Next, the confirmation unit 1627 performs the rearrangement of character regions by using the tentative candidate of line information to determine the reading order of characters. Finally, the confirmation unit 1627 compares the determined reading order of characters with the list order in the list of character information and judges the consistency therebetween. When consistent, the confirmation unit 1627 returns a success of confirmation to the line-box candidate creation 1625, and when inconsistent, the confirmation unit 1627 returns a fail of confirmation to the line-box candidate creation 1625.

The line information registration unit 1630 prepares a list of line information in the line information storage unit 1235 at the start of compression processing, and initializes that with null. The line information registration unit 1630 also registers the current line box candidate along with the corresponding alignment direction of characters at the tail end of the list of line information in response to a fail of confirmation by the confirmation unit 1627.

Figure 17:
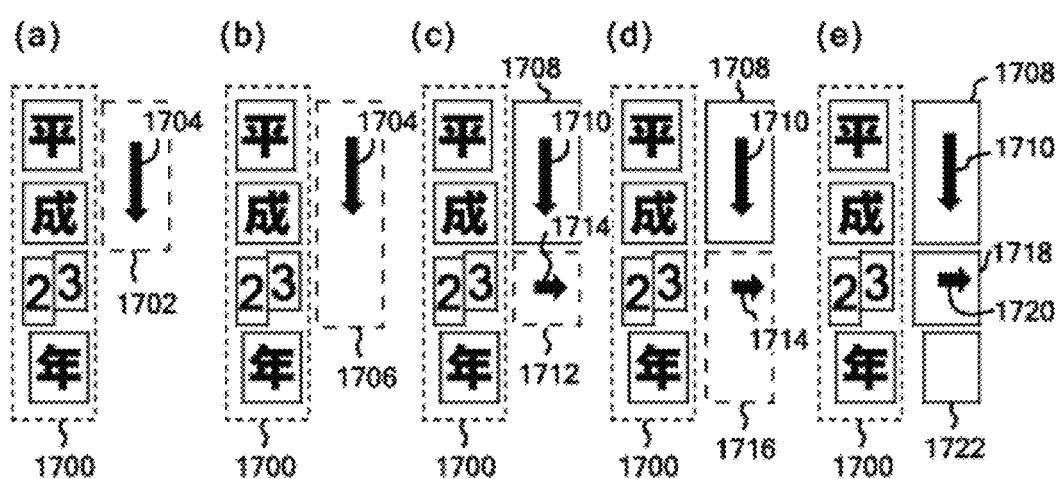
FIGS. 17(a) to 17(e) respectively are diagrams to illustrate each step of a compression process.

Referring to FIG. 17, each step of the compression process based on the result of confirmation processing by the confirmation unit 1627 will be described. It is assumed that at the start of processing, a list of character information extracted from image data 1700 of a character string "Hei Sei 23 Nen" shown in FIG. 17(*a*) is stored in the character information storage unit 1615. It is noted that image data 1700 shown in FIGS. 17(*a*) to 17(*e*) is the same as the image data 1100 shown in FIG. 11(*a*).

It is supposed that first at start up, a line box candidate 1702 and an alignment direction 1704 of characters are studied as the tentative candidate of line information by the confirmation unit 1627 (see FIG. 17(*a*)). Then, since the reading order (the order of 'Hei' and 'Sei') obtained by using the tentative candidate of line information is consistent with the list order (the order of 'Hei' and 'Sei') in the list of character information, the expansion processing by line-box candidate creation 1625 is executed, and the tentative line information is finalized as the current candidate of line information.

The current candidate of line information is expanded to include the character region of '2', and the line box candidate 1706 and the alignment direction 1704 of characters are studied as the tentative candidate of line information (see FIG. 17(*b*)). Then, since the reading order of characters (the order of 'Hei', 'Sei', '3', and '2') obtained by using the tentative candidate of line information is not consistent with the list order (the order of 'Hei', 'Sei', '2', and '3') in the list of character information, the expansion processing by line-box candidate creation 1625 will not be executed, and the current candidate of line information will be registered at the tail end of the list of line information as the line information (see line box 1708 and the alignment direction 1710 of characters in FIG. 17(*c*)). Moreover, the current candidate of line information is initialized with the character region of '2'.

The current candidate of line information which is initialized in the above described character region of '2' is expanded to include the character region of '3' by the confirmation unit 1627, and the line box candidate 1712 and the alignment direction 1714 of characters are studied as the tentative candidate of line information (see FIG. 17(*c*)). Then, since the reading order of characters (the order of '2' and '3') obtained by using the tentative candidate of line information is consistent with the list order (the order of '2' and '3') in the list of character information, the expansion processing by the line-box candidate creation 1625 is executed and the tentative line information is finalized as the current candidate of line information.

The current candidate of line information is expanded to include the character region of 'Nen', and the line box candidate 1716 and the alignment direction 1714 of characters are studied as the tentative candidate of line information. Then, since the reading order of characters (the order of '2', 'Nen', and '3') obtained by using the tentative candidate of line information is inconsistent with the list order (the order of '2'. '3', and 'Nen') in the list of character information, the expansion processing by the line-box candidate creation 1625 will not be executed, and the current candidate of line information is registered at the tail end of the list of line information as the line information (see the line box 1718 and the alignment direction 1720 of characters in FIG. 17(*e*)). Moreover, the current candidate of line information is initialized with the character region of 'Nen'. In this way, in Embodiment 4, the expansion processing is performed on condition that a proper reading sequence of characters is determined.

Figure 18:
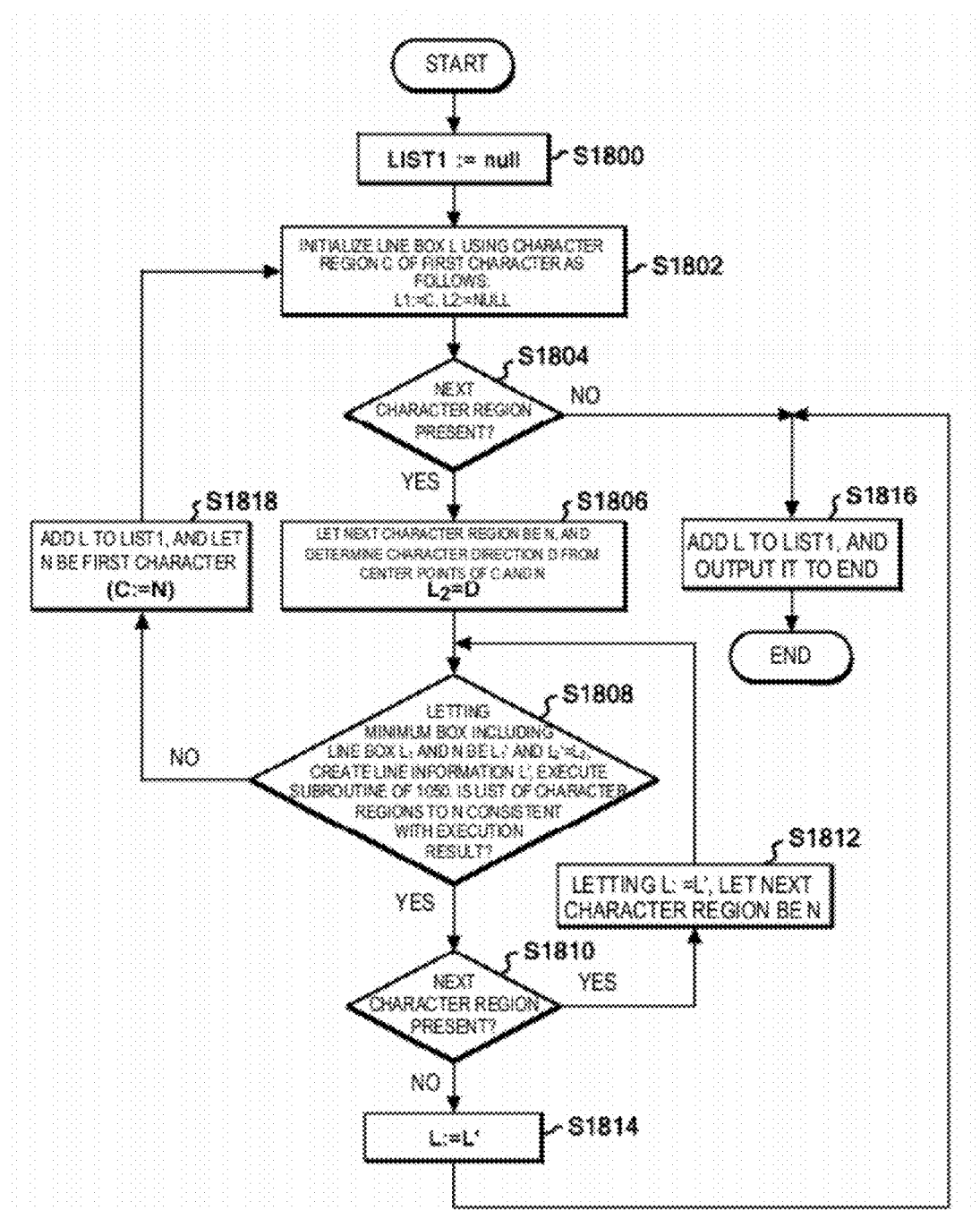
FIG. 18 shows an example of a general flow of the processing by a compression processing unit.

Referring to FIG. 18, the flow of compression processing by the compression processing unit 1620 relating to Embodiment 4 will be described. FIG. 18 is a flowchart to show an example of the flow of compression processing by the compression processing unit 1620 relating to Embodiment 4.

The compression processing shown in FIG. 18 starts from step 1800, and the line information registration unit 1630 prepares a list LIST1 of line information, in which line information is to be registered in the alignment order of lines, and initializes it by setting null thereto. Further, the line-box candidate creation unit 1625 reads out a character region C, which is at the first character from the head of the list of character information stored in the character information storage unit 1615, to set that to a line box candidate L1, and set null to the alignment direction L2 of characters corresponding to the line box candidate L1, thereby initializing the candidate L of line information (step 1802).

The line-box candidate creation unit 1625 judges whether or not next character region is present in the character information storage unit 1615 (step 1804). When next character region is present in the list of character information (step 1804: YES), letting the next character region be N, a unit vector ((0, 1) or (1, 0)) that points to a direction of the axis having a large absolute value of difference (max(|x1−x2|, |y1−y2|)) between the center point (x1, y1) of the line box candidate L1 and the center point (x2, y2) of a next character region N is determined to be the alignment direction D of characters, and is set to the alignment direction L2 of characters (step 1806).

After step 1806, the line-box candidate creation unit 1625 calls up the confirmation unit 1627, and the confirmation unit 1627 creates a tentative candidate L' of line information with a minimum rectangle including the line box candidate L1 and the character region N being as a tentative line box candidate L'1, and with the alignment direction L2 of characters being as a tentative alignment direction L'2 of characters (step 1808). Then, the confirmation unit 1627 executes a subroutine surrounded by a square 1050 of the flowchart shown in FIG. 10 with a tentative candidate L' of line information being as the next line box, and judges whether or not the alignment of character regions of execution result is consistent with the list order in the list of character information from the character region C of the current first character to the next character region N (step 1808).

When the alignment of character regions of execution result is inconsistent with the list order in the list of character information (step 1808: NO), the process proceeds to step 1818, and the line information registration unit 1630 adds the current candidate L of line information to the tail end of the list LIST1 of line information. Further, since the line information registration unit 1630 regards the character region N next to the current one as the first character of the list of character information, it sets the character region N to the current character region C of the first character. Then the process returns to step 1802, and the line-box candidate creation unit 1625 repeats the series of processing.

On the other hand, the alignment of character regions of execution result is consistent with the list order in the list of character information (step 1806: YES), the line-box candidate creation unit 1625 judges whether or not a next character region is present in the list of character information (step 1810), and when the next character region is present (step 1810: YES), lets the next character region be the character region N next to the current one, and finalizes the tentative candidate L' of line information be the current candidate L of line information (step 1812). Then the process returns to step 1808, the confirmation unit 1627 and the line-box candidate creation unit 1625 repeat the series of processing.

When next character region is not present in step 1810, the line-box candidate creation unit 1625 finalizes the tentative candidate L' of line information as the current candidate L of line information (step 1814). When all the character information which is listed in the list of character information has been read out from step 1814, or in step 1804, the process proceeds to step 1816, the line information registration unit 1630 registers the current candidate L of line information at the tail end of the list LIST1 of line information and outputs LIST1. Then, the process ends.

Figure 19:
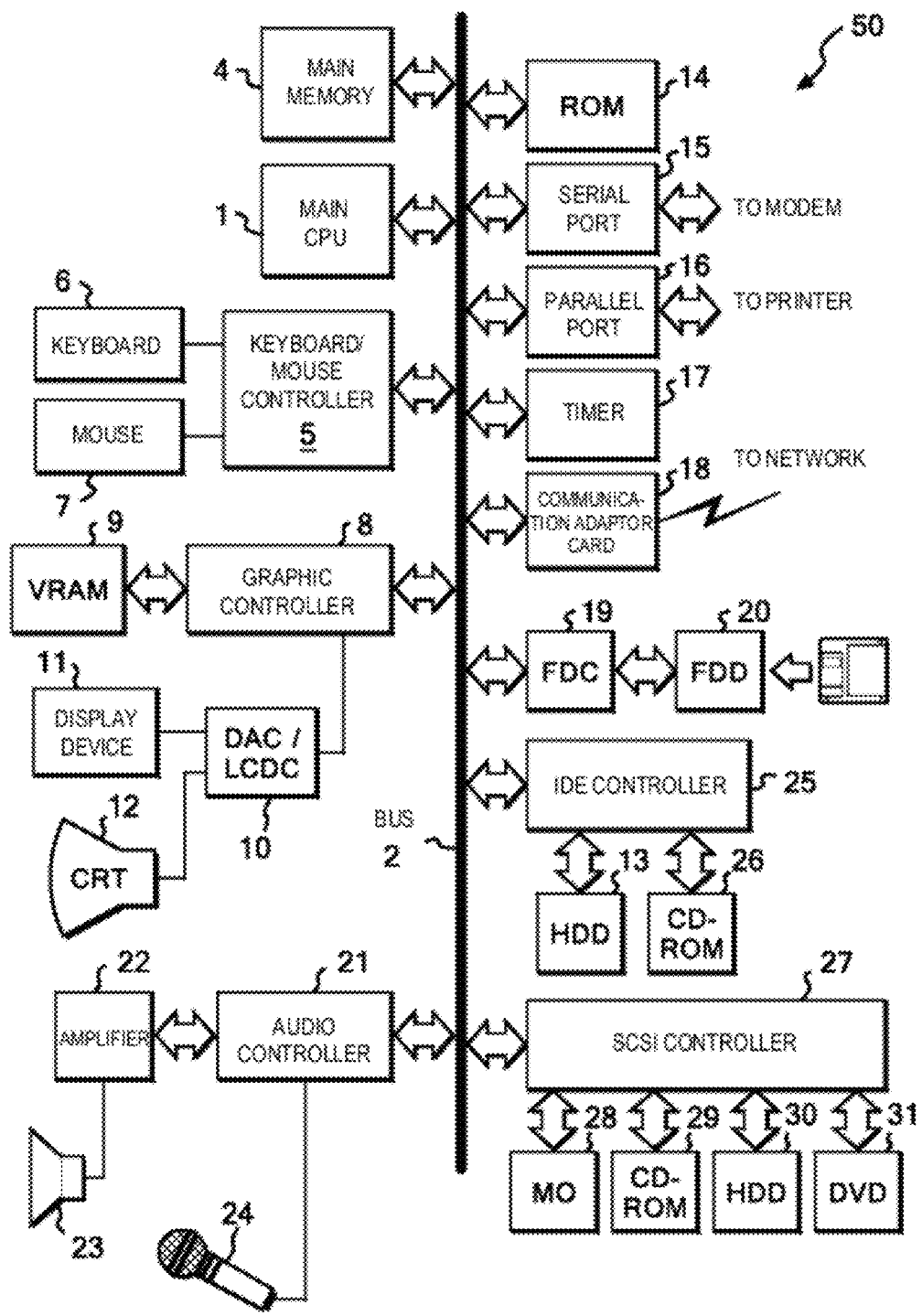
FIG. 19 shows an example of hardware configuration of an information processing apparatus suitable for implementing a reading order determination apparatus relating to an embodiment of the present invention.

FIG. 19 is a diagram to show an example of hardware configuration of a computer 50 as the reading order determination apparatus relating to any embodiment of the present invention. The computer 50 includes a main CPU (central processing unit) 1 and a main memory 4 which are connected to a bus 2. Hard disk drives 13 and 30, and removable storages (external storage systems having a replaceable recording medium) such as CD-ROM drives 26 and 29, a flexible disk drive 20, a MO drive 28, and a DVD drive 31 are connected to the bus 2 via a flexible disk controller 19, an IDE controller 25, a SCSI controller 27, and the like.

Recording media such as a flexible disk, a MO, a CD-ROM, and a DVD-ROM are inserted into the removable storages. These recording media, the hard disk drives 13 and 30, and the ROM 14 can record the codes of computer program for giving instructions to the CPU 1 in cooperation with an operating system and for implementing the present invention. That is, the above described various storage devices can record a reading order determination program which is installed in the computer 50 to make the computer 50 function as the reading order determination apparatus relating any embodiment of the present invention, and data such as a list of line information, a list of character information, and so on.

The above described reading order determination program includes a compression module, a modification module, and a decompression module. These modules work upon the CPU 1 to make the computer 50 function as a compression processing unit 120, 820, 1220, or 1620, a modification unit 105, 805, 1205, or 1605, and a decompression processing unit 140, 840, 1240, or 1640, respectively. The compression module includes a line-box candidate creation module, and a line-box information registration module. These modules work on the CPU 1 to make the computer 50 function as a line-box candidate creation unit 125 or 825, and a line information registration unit 130 or 830, respectively.

Alternatively, the compression module can include a line-box candidate creation module, a line-box candidate modification module, and a line-box information registration module. These modules work on the CPU 1 to make the computer function as a line-box candidate creation unit 1225, a line-box candidate modification unit 1227, and a line information registration unit 1230, respectively. Alternatively, the compression module can include a line-box candidate creation module, a confirmation module, and a line-box information registration module. These module work upon the CPU 1 to make the computer 50 function as a line-box candidate creation unit 1625, confirmation unit 1627, and a line information registration unit 1630, respectively. The decompression module includes a detection module, a subset determination module, a rearrangement module, and an order determination module.

These module work upon the CPU 1 to make the computer 50 function as a detection unit 145, 1245, or 1645, a subset determination unit 150, 1250, or 1650, a rearrangement unit 155, 1255, or 1655, and an order determination unit 160, 1260, or 1660, respectively. Alternatively, the decompression module can include a subset determination module, a rearrangement module, and an order determination module. These modules work upon the CPU 1 to make the computer 50 function as a subset determination unit 845, a rearrangement unit 850, and an order determination unit 855, respectively. A computer program can be compressed and also divided into multiple parts thereby being recorded in multiple media.

The computer 50 receives inputs from an input device such as a keyboard 6 and a mouse 7 via a keyboard/mouse controller 5. The computer 50 receives inputs from a microphone 24 via an audio controller 21 and also outputs a voice from a speaker 23. The computer 50 is connected to a display device 11 for presenting visual data to the user via a graphic controller 10. The computer 50 can be connected to a network via a network adaptor 18 (Ethernet® card and a token ring card) etc. to communicate with other computers, etc.

It will be readily understood from the above description that the computer 50 can be readily realized by an information processing apparatus such as an ordinary personal computer, a work station, a main frame, etc. or a combination of these. It is noted that components described above are exemplary, and not all of the components thereof are necessarily an indispensable component of the present invention.

Although the present invention has been described by using embodiments, the technical scope of the present invention will not be limited to the range of statement in the above described embodiments. It will be obvious to those skilled in the art that various modifications and improvements can be made to the above described embodiments. Therefore, it is needless to say that embodiments with such modifications or improvements are also included in the technical scope of the present invention.

Note that execution orders of each processing such as actions, procedures, steps, and stages, etc. in the apparatuses, systems, programs, and methods shown in the claims of patent, specification, and drawings are not explicitly stated in particular as "before", "prior to", etc., and can be realized in an arbitrary order unless the output of previous processing is utilized in subsequent processing. Moreover, it is to be noted that even when an output of preceding processing is used in subsequent processing, there can be a case where another processing can be interposed between the preceding processing and the subsequent processing, and even if it is stated that another processing is interposed, there can be a case where a change can be made such that the preceding processing is performed immediately before the subsequent processing. Even if the operational flow in the claims, specification, and drawings is described by conveniently using "first", "next", "successively", etc., it does not necessarily mean that the operation must be performed in such order.

We claim:

1. A reading order determination apparatus for determining a reading order of characters, comprising:
   a character information storage unit for storing a list of character information, wherein the list containing character information made up of text data and character region data of each character extracted from image data by character recognition processing aligned in a reading order of characters;
   a line information storage unit for storing a list of line information, wherein the list listing line information made up of a line box that surrounds a set of characters continuously aligned in the same direction and an alignment direction of characters in the line box in the alignment order of lines;

a detection unit for, in response to a request for addition of character information to the list of character information, detecting line information having a line box containing a region indicated by character region data of added character information from the list of line information;

a subset determination unit for obtaining a subset of character region data from the list of character information, each character region data indicating a region contained in the line box of the line information detected by said detection unit;

a rearrangement unit for rearranging each character region data in the subset according to a position with respect to an alignment direction of characters of the line information that has been detected; and a order determination unit for determining a reading order of characters in the list of character information by updating the list of character information based on an alignment order of character region data in the subset.

2. The reading order determination apparatus according to claim 1, further comprising:

a line-box candidate creation unit for reading out character region data in order from a head of the list of character information to assume the same to be a current character region, wherein the line-box candidate creation unit initializes a line box candidate with first character region data and determines an alignment direction of characters in the line box candidate by means of first two character region data, and the line-box candidate creation unit expands the line box candidate to a minimum line box further containing the current character region until the current character region becomes absent in the alignment direction of characters in the line box candidate; and a line information registration unit for registering a current line box candidate along with a corresponding alignment direction of characters to the list of line information as line information in response to the current character region becoming absent in the alignment direction of characters in the line box candidate, wherein the line-box candidate creation unit repeats a series of processing with assumption of the current character region being a head of the list of character information in response to the current character region becoming absent in the alignment direction of characters in the line box candidate.

3. The reading order determination apparatus according to claim 2, further comprising:

a line-box candidate modification unit for dividing, on condition that the current character region is contained in either of the current line box candidate or a past line box candidate registered in the list of line information, the line box candidate containing the current character region vertically with respect to a corresponding alignment direction of characters and with reference to a center point of the current character region instead of expanding the current line box candidate by said line-box candidate creation unit, the line-box candidate modification unit modifies the divided line box candidate based on character region data contained in the line box candidate, and the line-box candidate modification unit creating line information of which line box is the character region for each character region which has become not contained therein as a result of division.

4. The reading order determination apparatus according to claim 1, further comprising:

a line-box candidate creation unit for reading out character region data in order from the head of the list of character information to assume the same to be a current character region, wherein the line-box candidate creation unit initializes a line box candidate with first character region data and determining an alignment direction of characters in the line box candidate by means of first two character region data, and the line-box candidate creation unit executes an expansion processing to expand the line box candidate to a minimum line box further containing the current character region under a certain condition;

a confirmation unit for confirming that a reading order of characters is properly determined based on a line box candidate to be created by expansion and the alignment direction of characters in the line box candidate before executing the expansion processing by said line-box candidate creation unit; and a line information registration unit for registering a current line box candidate along with the corresponding alignment direction of characters in the list of line information as line information in response to a fail of confirmation by said confirmation unit, wherein said line-box candidate creation unit executes the expansion processing on condition of a success of confirmation by the confirmation unit, and when the confirmation fails, repeats processing with the current character region being as a head of the list of character information.

5. The reading order determination apparatus according to claim 1, wherein the image data is image data for one page of document, or image data for a unified region within one page of document.

6. The reading order determination apparatus according to claim 1, further comprising:

a modification unit for receiving an instruction of adding character information to the list of character information, as well as text data and corresponding character region data as character information, and adding the character information at a head or a tail end of the character information.

* * * * *